United States Patent
Allen, Jr. et al.

(10) Patent No.: US 7,304,986 B2
(45) Date of Patent: Dec. 4, 2007

(54) ATM-BASED DISTRIBUTED NETWORK SWITCHING SYSTEM

(75) Inventors: George Coleman Allen, Jr., Pflugerville, TX (US); Steven R. Partridge, Austin, TX (US); Samuel Sigarto, Raleigh, NC (US); Tina Sigarto, Raleigh, NC (US); Haifeng Bi, Austin, TX (US); Richard Wayne Stephenson, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 0 days.

(21) Appl. No.: 11/481,801

(22) Filed: Jul. 7, 2006

(65) Prior Publication Data

US 2006/0274735 A1 Dec. 7, 2006

Related U.S. Application Data

(63) Continuation of application No. 10/859,971, filed on Jun. 4, 2004, now Pat. No. 7,095,734, which is a continuation of application No. 09/576,036, filed on May 23, 2000, now Pat. No. 6,765,903, which is a continuation-in-part of application No. 09/287,092, filed on Apr. 7, 1999, now Pat. No. 6,169,735.

(60) Provisional application No. 60/083,640, filed on Apr. 30, 1998.

(51) Int. Cl.
*H04L 12/66* (2006.01)
*H04L 12/28* (2006.01)
*H04L 12/56* (2006.01)
*H04J 3/12* (2006.01)

(52) U.S. Cl. ............ 370/356; 370/401; 370/522

(58) Field of Classification Search .......... 370/225, 370/352–354, 356, 395.5, 401, 466–467, 370/522
See application file for complete search history.

(56) References Cited

U.S. PATENT DOCUMENTS

| | | | |
|---|---|---|---|
| 5,260,978 A | 11/1993 | Fleischer et al. | |
| 5,339,318 A | 8/1994 | Tanaka et al. | |
| 5,363,369 A | 11/1994 | Hemmady et al. | |
| 5,365,524 A | 11/1994 | Hiller et al. | |
| 5,392,402 A | 2/1995 | Robrock, II | |
| 5,428,607 A | 6/1995 | Hiller et al. | |
| 5,434,853 A | 7/1995 | Hemmady et al. | |
| 5,434,854 A | 7/1995 | Focarile et al. | |
| 5,438,565 A | 8/1995 | Hemmady et al. | |

(Continued)

OTHER PUBLICATIONS

ATM Forum Technical Committee, "Circuit Emulation Service Interoperability Specification", Version 2.0 Published Jan. 1997.

(Continued)

*Primary Examiner*—Kevin C. Harper
(74) *Attorney, Agent, or Firm*—Greenblum & Bernstein, P.L.C.

(57) ABSTRACT

A distributed network switching system includes a data network. The system also includes multiple access interworking function (A-IWF) devices each operating as a gateway that enables customer premises devices to directly interface into the data network. The system further includes a centralized control and signaling interworking function (CS-IWF) device that performs call control functions and administrative functions and is adapted to interface narrowband and broadband signaling for call processing and control within the data network.

15 Claims, 10 Drawing Sheets

U.S. PATENT DOCUMENTS

| | | | |
|---|---|---|---|
| 5,459,722 A | 10/1995 | Sherif | |
| 5,463,621 A | 10/1995 | Suzuki | |
| 5,483,527 A | 1/1996 | Doshi et al. | |
| 5,490,140 A | 2/1996 | Abensour et al. | |
| 5,513,174 A | 4/1996 | Punj | |
| 5,539,884 A | 7/1996 | Robrock, II | |
| 5,568,475 A | 10/1996 | Doshi et al. | |
| 5,581,551 A | 12/1996 | Fundneider et al. | |
| 5,619,500 A | 4/1997 | Hiekai | |
| 5,623,491 A | 4/1997 | Skoog | |
| 5,638,365 A | 6/1997 | Duault et al. | |
| 5,684,800 A | 11/1997 | Dobbins et al. | |
| 5,703,876 A | 12/1997 | Christie | |
| 5,710,769 A | 1/1998 | Anderson et al. | |
| 5,719,863 A | 2/1998 | Hummel | |
| 5,757,783 A | 5/1998 | Eng et al. | |
| 5,781,320 A | 7/1998 | Byers | |
| 5,784,371 A | 7/1998 | Iwai | |
| 5,796,836 A | 8/1998 | Markham | |
| 5,825,750 A | 10/1998 | Thompson | |
| 5,845,211 A | 12/1998 | Roach, Jr. | |
| 5,867,571 A | 2/1999 | Borchering | |
| 5,883,893 A | 3/1999 | Rumer et al. | |
| 5,889,773 A | 3/1999 | Stevenson, III | |
| 5,896,377 A | 4/1999 | Boot et al. | |
| 5,898,673 A | 4/1999 | Riggan et al. | |
| 5,914,956 A | 6/1999 | Williams | |
| 5,920,559 A | 7/1999 | Awaji | |
| 5,926,464 A | 7/1999 | Fraser | |
| 5,930,238 A | 7/1999 | Nguyen | |
| 5,943,321 A | 8/1999 | St-Hilaire et al. | |
| 5,953,316 A | 9/1999 | Lazar et al. | |
| 5,956,334 A | 9/1999 | Chu et al. | |
| 5,991,301 A | 11/1999 | Christie | |
| 5,991,746 A | 11/1999 | Wang | |
| 6,009,100 A | 12/1999 | Causmann et al. | |
| 6,028,933 A | 2/2000 | Heer et al. | |
| 6,031,840 A | 2/2000 | Christie et al. | |
| 6,035,405 A | 3/2000 | Gage et al. | |
| 6,049,531 A | 4/2000 | Roy | |
| 6,055,232 A | 4/2000 | Ward et al. | |
| 6,101,183 A | 8/2000 | Byers | |
| 6,118,759 A | 9/2000 | Ohyoshi et al. | |
| 6,122,275 A | 9/2000 | Karol et al. | |
| 6,134,235 A | 10/2000 | Goldman et al. | |
| 6,141,339 A | 10/2000 | Kaplan et al. | |
| 6,151,315 A | 11/2000 | Ash et al. | |
| 6,169,735 B1 | 1/2001 | Allen et al. | |
| 6,175,622 B1 | 1/2001 | Chiniwala et al. | |
| 6,195,333 B1 | 2/2001 | Wise | |
| 6,195,714 B1 | 2/2001 | Li et al. | |
| 6,219,348 B1 | 4/2001 | Allen, Jr. et al. | |
| 6,252,952 B1 | 6/2001 | Kung et al. | |
| 6,263,212 B1 | 7/2001 | Ross et al. | |
| 6,275,493 B1 | 8/2001 | Mottis et al. | |
| 6,282,194 B1 | 8/2001 | Cheesman et al. | |
| 6,339,830 B1 | 1/2002 | See et al. | |
| 6,343,065 B1 | 1/2002 | Serbest et al. | |
| 6,345,048 B1 | 2/2002 | Allen, Jr. et al. | |
| 6,389,011 B2 | 5/2002 | Allen, Jr. et al. | |
| 6,470,018 B1 | 10/2002 | Wiley et al. | |
| 6,563,918 B1 | 5/2003 | Nelson et al. | |
| 6,570,869 B1 * | 5/2003 | Shankar et al. | 370/352 |
| 6,643,282 B1 | 11/2003 | Christie | |
| 6,757,278 B1 | 6/2004 | Bi et al. | |
| 6,765,903 B1 | 7/2004 | Allen, Jr. et al. | |
| 6,782,004 B1 | 8/2004 | Brusilovsky et al. | |
| 6,870,827 B1 | 3/2005 | Voit et al. | |
| 2001/0036188 A1 | 11/2001 | Carlsson | |
| 2002/0009086 A1 | 1/2002 | Gallant et al. | |
| 2002/0061101 A1 | 5/2002 | Hall, Jr. et al. | |
| 2002/0064129 A1 | 5/2002 | Serbest et al. | |
| 2002/0075855 A1 | 6/2002 | Bruno et al. | |
| 2004/0022237 A1 | 2/2004 | Ellott et al. | |
| 2004/0179531 A1 | 9/2004 | Bi et al. | |
| 2006/0034265 A1 * | 2/2006 | Thompson | 370/352 |

OTHER PUBLICATIONS

ATM Forum Technical Committee, "Voice and Telephony Over ATM-ATM Trunking Using AAL1 for Narrowband Services", Version 1.0, Published Jul. 1997.

Malik, O., "It's the Voice, Stupid", Forbes, Digital Tool, Sep. 8, 1999.

ITU-T Recommendation Q.2955.1, "Stage 3 Description for Community of Interest Supplementary Services Using B-ISDN DSS 2: Closed User Group (CUG)", Jun. 1997.

Lucent Technologies, "NavisCore ATM Configuration Guide", Chapter 15, pp. 15-1 to 150-13, no date.

Jomer, P., "Connection Caching of Traffic Adaptive Dynamic Virtual Circuits", Computer Communication Review, vol. 19, No. 4, Sep. 1989, pp. 13-24.

Clark, R. J. et al., "Deploying ATM in a Data Network: An Analysis of SVC Requirements", Oct. 16, 1995, p. 9-18.

ITU-T Recommendation Q.2955.1, "Stage 3 Description for Community of Interest Supplementary Services Using B-ISDN DSS 2: Closed User Group (CUG)", Jun. 1997.

Lucent Technologies, "NavisCore ATM Configuration Guide", Chapter 15.

ATM Forum Technical Committee "Traffic Management Specification", Version 4.0, Document af-tm-0056-000, Apr. 1996.

ATM Forum Technical Committee "ATM Security Specification," Version 1.0, Document af-sec-0100-001, Feb. 1999.

Iwata et al.., "An ATM Subscriber Line Interface Circuit for Voice and Telephony over ATM (VTOA)," IEEE, vol. (Nov. 13, 1995) XP010607567.

* cited by examiner

ATM-BASED DISTRIBUTED NETWORK SWITCHING SYSTEM

CROSS-REFERENCE TO RELATED APPLICATIONS

This application is a continuation of U.S. patent application Ser. No. 10/859,971, filed Jun. 4, 2004, now U.S. Pat. No. 7,095,734, which is a continuation of U.S. patent application Ser. No. 09/576,036, filed May 23, 2000, which is now U.S. Pat. No. 6,765,903, which is a continuation-in-part of U.S. patent application Ser. No. 09/287,092, filed Apr. 7, 1999, to George C. ALLEN Jr. et al., entitled "ATM-based Distributed Virtual Tandem Switching System," now U.S. Pat. No. 6,169,735 that issued Jan. 2, 2001, which claims the benefit of U.S. Provisional Patent Application No. 60/083,640, filed on Apr. 30, 1998, entitled "ATM-Based Distributed Virtual Tandem Switching System" to ALLEN et al., the disclosures of which are expressly incorporated herein by reference in their entireties.

BACKGROUND OF THE INVENTION

1. Field of the Invention

The present invention relates to telecommunications. More particularly, the present invention relates to an ATM-based distributed network switching system for use within a public switched telephone network (PSTN).

2. Background Information

Today's network backbone is a consolidation of dissimilar networks, including, for example, asynchronous transfer mode (ATM), frame relay, time division multiplex (TDM), private line, etc. The variety of networks is necessary to accommodate different types of access, e.g., xDSL, ISDN, line access, etc.

The present day network backbone employs numerous protocols because each type of network requires its own protocols. Even within the voice network alone, there are multiple protocols and thus protocol conversions are required. That is, an incoming protocol, e.g., Bellcore GR-303, communicates with digital loop carriers (DLCs) to control voice channels coming into the switch. Within the switch, a different switch protocol transfers the traffic through the switch. To further complicate the situation, the internal switch protocol of each vendor is proprietary. Another protocol, i.e., a trunk protocol (e.g., Signaling System 7 (SS7)), is necessary to move the traffic from the originating switch to the destination switch. The large number of protocols operating within the network backbone complicates communications across the backbone.

The present day backbone has disadvantages other than a plethora of protocols. For example, each type of network is managed in a different manner with its own management system, often from a different location. Thus, many areas of expertise are required to manage the network backbone. In other words, a large number of engineers, having different skill sets, is required to manage the heterogeneous network.

The present day central office architecture also demands burdensome engineering and management. More specifically, each central office must be managed separately. To compound the problem, each central office has a unique configuration, different from each other central office. For example, different central offices may have different vendor's switches (switch types), as well as different switch hardware configurations. Thus, a variety of personnel, with different skill sets is required to manage a unique central office. In addition, the engineering of facilities and trunks between central offices and their switches consumes a large number of personnel with unique skill sets as well as physical resources.

It has been proposed to replace tandem switches with a distributed architecture, referred to as Voice Trunking over ATM (VTOA), to reduce the number of trunks between central offices and accordingly engineering of trunks between end offices. VTOA is, however, limited to trunk interconnection (that is, service provider's switch interconnection as opposed to customer's access) and still requires the services of Class 5 switches. Consequently, even with VTOA, the network backbone requires multiple protocols and additional hardware to provide all the necessary switch interconnection.

Another problem with today's voice network is that end office Class 5 switches, such as the Lucent 5ESS and Nortel DMS 100, are proprietary switches employing proprietary hardware and software. That is, upgrading and replacing of switches is not an easy task, in part due to this proprietorship. Thus, a need exists for components with a generic hardware implementation that relies upon software and personality cards to provide specific functionality.

The current network architecture does not distribute well within a metropolitan area due to the transport requirements and technology base of the current Class 5 switches. Thus, the current central office based telephony topology is constrained to geographical boundaries and often requires digital loop carriers (DLCs) and other remote telephony units. Therefore, a need exists to replace today's end office Class 5 switches with a distributed switching system. This will allow the extension of the central office switch boundaries to the controlled environment vault (CEV) of the carrier serving area (CSA) or even to the customer premises for medium and large customers.

Thus, a need exists for a streamlined network backbone that allows all kind of access and is managed by a single management system from a single location or a limited number of locations. The management system should be able to converse with all components of the network using a single standardized protocol, significantly reducing the need for protocol conversion. It would also be desirable if proprietary hardware could be eliminated. Such a network would only require expertise in a single area and thus would reduce the personnel required for network management.

Glossary of Acronyms
A-IWF Access Interworking Function
AAL ATM Adaptation Layer
ABR Available Bit Rate
ACM Address Complete Message
ADPCM Adaptive Differential Pulse Code Modulation
ADNSS ATM Based Distributed Network Switching System
ADSL Asymmetric Digital Subscriber Line
AIN Advanced Intelligent Network
ANM Answer Message
ANSI American National Standards Institute
ATM Asynchronous Transfer Mode
BAF Bellcore AMA Format
B-ISUP Broadband ISDN User Part
CAS Channel Associated Signaling
CBR Constant Bit Rate
CCS Common Channel Signaling
CES Circuit Emulation Service
CEV Controlled Environment Vault
CIC Circuit Identification Code
CSA Carrier Serving Area
CS-IWF Control and Signaling Interworking Function
DLC Digital Loop Carrier DPC Destination Point Code
DS0 Digital Signal Level 0 (64 Kbps digital signal format)
DS1 Digital Signal Level 1 (1.544 Mbps digital signal format)
IAM Initial Address Message
IP Internet Protocol
IPM Impulses Per Minute
ISDN Integrated Service Digital Network
ISUP ISDN User Part
ITU-T International Telecommunications Union-Telecommunications
IWF Interworking Function
IXC Interexchange Carrier
LA-IWF Line Access Interworking Function
LA-CPS Line Access Call Processor Server
OAM&P Operations, Administration, Maintenance, and Provisioning
OC12 Optical Carrier level 12 signal (622 Mbps)
OC3 Optical Carrier level 3 signal (155 Mbps)
OPC Originating Point Code
OSS Operations Support Systems
PCM Pulse Code Modulation
PLA-IWF Private Line Interworking Function
PNNI Private Network-Network Interface
POTS Plain Old Telephone Service
PSTN Public Switched Telephone Network
PVC Permanent Virtual Connection
SS7 Signaling System 7
SSP Service Switching Point
STP Signal Transfer Point
STS1 Synchronous Transport Signal, level 1
SVC Switched Virtual Connection
TACPS Trunk Access Call Processing Server
TA-IWF Trunk Access Interworking Function
TDM Time Division Multiplexing
UBR Undefined Bit Rate
UNI User-to-Network Interface
VPI/VCI Virtual Path Identifier/Virtual Channel Identifier
VTOA Voice and Trunking over ATM
xDSL Digital Subscriber Line

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF THE EMBODIMENTS

Figure 1:
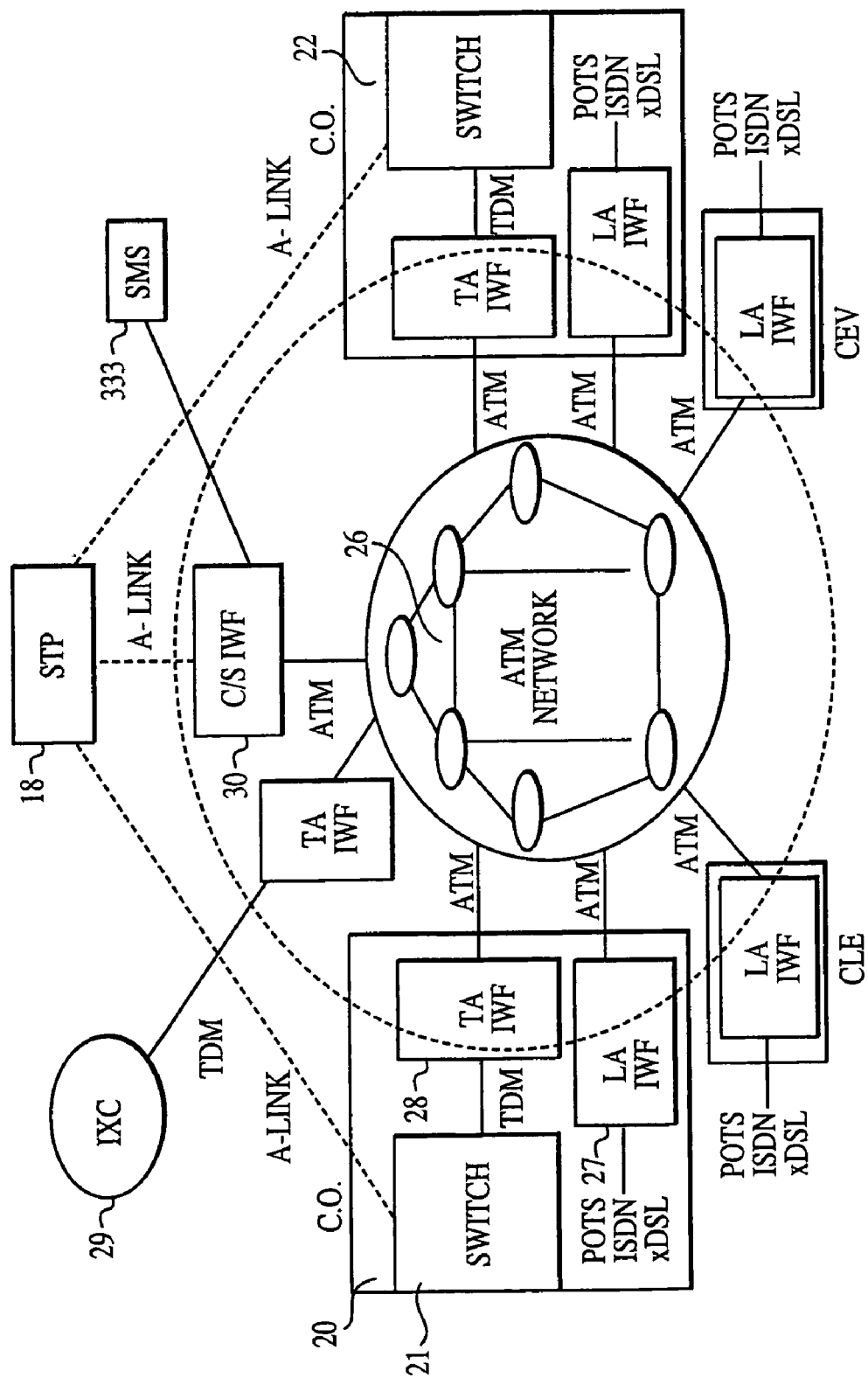
FIG. 1 shows an exemplary architecture of an ATM-based distributed network switching system, according to an aspect of the present invention.

In view of the foregoing, the present invention is directed to providing an ATM-based distributed network switching system (ADNSS) to replace the standard network backbone. Such a system is streamlined and reduces necessary trunk groups without decreasing call processing volume. Moreover, the present invention enables residential and enterprise customer's desired access types to interface into the network.

According to the present invention a new architecture of voice switching, the ATM Based Distributed Network Switching System (ADNSS), is provided. The new architecture employs ATM technology as the network fabric, a server farm for call control and administrative functions, and edge devices that provide traditional and new types of access to the network. The distributed edge devices are referred to generically as access interworking functions (or A-IWFs). The network fabric includes a distributed partial mesh of ATM switches. The server farm consists of a signaling gateway, a call control server, a billing server, a tone and announcement server, and a switch management server.

According to an aspect of the present invention, an Asynchronous Transfer Mode (ATM) based distributed network switching system (ADNSS) is provided. The system includes a distributed ATM switching network; and multiple access interworking function (A-IWF) devices each operating as a gateway that enables standard telephony access and data circuit type access to interface into the distributed ATM switching fabric. The system also includes a centralized control and signaling interworking function (CS-IWF) device that performs call control functions and administrative functions. The CS-IWF device is adapted to interface narrowband and broadband signaling for call processing and control within the ATM switching network and may be a server farm. The server farm includes a signaling gateway that interfaces the CS-IWF to a narrowband network; a billing server that creates and collects call detail records for call attempts through the ADNSS; and a feature server that performs call control functions. The feature server may include a system management server that performs operations, administration, maintenance, and provisioning (OAM&P); and a call control server. The call control server performs call control functions and device control functions for the A-IWFs. The call control server supports, transparent to the user, services and features currently supported by the Class 5 telephone switch. These services may include all switch based (e.g., call waiting, three way calling, call forwarding, etc.) and network based (calling line ID, calling name delivery, automatic callback, etc.) features. The server farm may also include a tone and announcement server that provides telephone network tones and announcements.

According to another aspect of the present invention, each A-IWF device also includes a line access interworking function (LA-IWF) that interfaces with two or four wire loop customer premises devices that provide POTS, ISDN, Coin and xDSL telephony services. The LA-IWF may also include a trunk access interworking function that converts end office voice trunks from TDM channels to ATM cells by employing a circuit emulation service. Each LA-IWF may include personality cards, each personality card controlling the type of access the LA-IWF accommodates.

According to another aspect of the present invention, the A-IWF functions as a private line access interworking function (PLA-IWF) device that supports dedicated bandwidth circuits interfacing with customer private lines. In one embodiment, the private line circuits are setup and disconnected from a single point of provisioning. Moreover, the private line circuits are SVCs that guarantee a pre-specified bandwidth. If an SVC fails, the SVC is released and another SVC is established so that the failed SVC is restored.

According to another aspect of the present invention, a method is provided for setting up and connecting a call across an ATM-based distributed network switching system that includes an originating LA-IWF, a terminating LA-IWF, and a LACPS. The method includes scanning access devices with the originating LA-IWF to detect an off-hook condition of one of the access devices; and generating a dial tone from the LACPS and transmitting the dial tone via the originating LA-IWF to the off-hook access device. The method also includes collecting dialed digits at the originating LA-IWF and forwarding the digits to the LACPS; and determining a routing destination at the LACPS. The method further includes informing the terminating LA-IWF, associated with the routing destination, of a call termination request and an address of the originating LA-IWF; and establishing a network path from the terminating LA-IWF to the originating LA-IWF.

In one embodiment, the originating LA-IWF provides the dial tone to the off-hook access device. The informing may also include informing the originating LA-IWF of an address of the terminating LA-IWF and a port where the dialed digits reside. In this case, establishing the network path also includes establishing a network path from the originating LA-IWF to the terminating LA-IWF. Alternatively, or in addition, the network path may be established from the originating LA-IWF to the terminating LA-IWF. In another embodiment, the LACPS performs administrative measurements, and initiates billing of the call.

According to another aspect of the present invention, a method is provided for provisioning a private line in an ATM based distributed network switching system. The method includes receiving an order for a dedicated circuit from an originating office to a terminating office; and entering the order into a provisioning system to define the point to point circuit. The method also includes determining idle port equipment; assigning a permanently assigned or "nailed up" SVC from the originating office to the terminating office in a service order; and informing a PLA-IWF associated with the originating office that the SVC needs to be setup. The method further includes formulating a message to setup the SVC; setting an internal cross connect from the port assigned by the service order to an ATM VPI/VCI assigned to the SVC; and informing a PLA-IWF associated with the terminating office that a port assigned by the service order will be slaved to the originating office's assigned port. The method also includes associating the ports; receiving the setup message from the originating office; and setting the cross-connect between the assigned ATM VPI/VCI and TDM port.

According to another aspect of the present invention, an Asynchronous Transfer Mode (ATM) based distributed network switching system (ADNSS) includes a distributed ATM switching network. The system also includes multiple access interworking function (A-IWF) devices each operating as a gateway that enables customer premises devices to directly interface into the distributed ATM switching fabric. The system further includes a centralized control and signaling interworking function (CS-IWF) device that performs call control functions and administrative functions and is adapted to interface narrowband and broadband signaling for call processing and control within the ATM switching network. In one embodiment, each A-IWF includes personality cards, each personality card controlling the type of access the A-IWF accommodates.

According to another aspect of the present invention, an Asynchronous Transfer Mode (ATM) based distributed network switching system (ADNSS) includes an distributed ATM switching network. The system also includes line access interworking function (LA-IWF) devices, each operating as a gateway that enables customer premises devices to directly interface into the distributed ATM switching fabric. The LA-IWF interfaces with two or four wire loop customer premises devices that provide POTS, ISDN, Coin and xDSL telephony services. The system further includes a centralized control and signaling interworking function (CS-IWF) device that performs call control functions and administrative functions and is adapted to interface narrowband and broadband signaling for call processing and control within the ATM switching network. The CS-IWF includes a server farm consisting of a signaling gateway that interfaces the CS-IWF to a narrowband network, a billing server that creates and collects call detail records for call attempts through the ADNSS, and a feature server. The feature server includes a system management server that performs operations, administration, maintenance, and provisioning (OAM&P), a call control server that performs call control functions and device control functions for the A-IWFs. The call control server supports, transparent to the user, services and features currently supported by the Class 5 telephone switch, such as switch based (e.g., call waiting, three way calling, call forwarding, etc.) and network based (e.g., calling line ID, calling name delivery, automatic callback, etc.) features. The feature server also includes a tone and announcement server that provides telephone network tones and announcements. In one embodiment, each LA-IWF includes personality cards, each personality card controlling the type of access the LA-IWF accommodates. Personality cards, as are well known, are service specific cards specifically built for a specific service.

Referring now to FIG. 1, the ATM-based distributed network switching system according to the present invention is described. Originating end office (interchangeably referred to as central office) building 20 and terminating end office building 22 each typically house Class 5 switches such as the 5ESS available from Lucent Technologies, Inc. of Murray Hill, N.J., or the DMS 100 available from Northern Telecom Ltd. (Nortel Networks) of Canada. However, any other Class 5 end office switch may be substituted for the Nortel and Lucent switches. Within each end office building resides an access interworking function such as a line access interworking function (LA-IWF) 27; and a trunk access interworking (TA-IWF) function 28 (previously referred to as a T-IWF). Alternatively, the LA-IWF 27 can reside outside of the end office building and in the case of interfacing with an interexchange carrier (IXC) 29, the TA-IWF unit 28 can reside outside of the end office building. Also shown is a signaling transfer point (STP) 18. The signaling transfer point 18 is well known in the art and may be provided, for example, by Alcatel of France. The signaling transfer point 18 communicates with the end offices 20, 22 via SS7 signaling. An asynchronous transfer mode (ATM)

switching network 26 is also provided. The ATM switches within the network can be provided by vendors such as, but not limited to, Lucent Technologies, Cisco Systems, Inc. of San Jose, Calif., or Nortel Networks.

The TA-IWF 28 converts end office voice trunks from TDM channels to ATM cells. More particularly, the TA-IWF 28 segments the 64 Kbps bearer channels into ATM cells in one direction and reassembles ATM cells in the 64 Kbps channels in the other direction. Preferably, the TA-IWFs 28 are distributed throughout the PSTN with a TA-IWF 28 corresponding to each end office 20, 22. An exemplary TA-IWF 28 is a Succession Multiservice Gateway (SMG) 4000, provided by Nortel. However, any other suitable TA-IWF 28 may be employed.

The LA-IWF 27 supports line access functions for Plain Old Telephone Service (POTS), ISDN Digital Subscriber Line, Coin, Frame Relay, native ATM, SONET, and the xDSL family of data access lines. The LA-IWF 27 will also support future types of access as they become available. For the xDSL line the LA-IWF 27 supports the data channel to the data network. The function of the LA-IWF unit 27 is based on the card type, (personality cards) populated in application card slots on the unit. The LA-IWF 27 can also incorporate the trunk interface functions of the TA-IWF 28 as well as private line and wireless access. That is, it is contemplated that the LA-IWF 27 and TA-IWF 28 units could merge into a common platform that would perform the access and trunk functions of the telephone switch as well as private line (data) access and wireless telephony access.

The ATM-based distributed network requires a centralized control and signaling interworking function (CS-IWF) device 30. Although described as a device, the CS-IWF 30 can be multiple devices or any combination of hardware and software. The CS-IWF 30 performs necessary call control functions as well as conversion between a narrowband signaling, e.g., SS7 protocol, and a broadband signaling protocol for call processing and control within the ATM network. Preferably, a single CS-IWF 30 serves all LA-IWFs 27 and TA-IWFs 28 in a metropolitan area. An exemplary CS-IWF 30 is a Succession Call Server (SCS), provided by Nortel. However, any other suitable CS-IWF 30 may be employed.

The LA-IWFs 27, TA-IWFs 28, the CS-IWF 30, the ATM switching network 26, and the interconnecting links together comprise the ATM-based distributed network switching system. The system is considered to be distributed because the switching functions are carried out in part by the LA-IWFs 27 that are located near the end offices 20, 22 in a distributed manner.

Thus, the present invention reduces the total number of trunks needed in an end office 20, 22, improves trunk utilization, and reduces or eliminates the task of trunk forecasting and provisioning. According to one embodiment, for local calls, other than 911, directory assistance and operator calls, trunks can be altogether eliminated. Network based call centers can replace even these trunks. Furthermore, growth in trunking needs by the end office switches 20, 22 can be more easily met because the TA-IWF aspect of the present invention allows scalability supported by ATM networks. The scalability is achieved because of the ATM network's greater bandwidth and the ATM network's statistical multiplexing, which more efficiently utilizes existing bandwidth.

TA-IWF

Deployment of the TA-IWFs 28 allows an end office 20, 22 to handle normal call volumes while having only one or a few large trunk groups connected to the network, thus eliminating the need to provision separate trunk groups to different destination end offices. In addition, the total trunking bandwidth is shared by traffic to all destinations because ATM virtual connections are provisioned on demand by signaling. Consequently, bandwidth is not dedicated to any TDM voice channels between predetermined locations, but rather is dynamically shared.

The trunk access interworking function TA-IWF 28 is a device that is preferably located in the same structure or building that houses each end office switch 20, 22. More particularly, the TA-IWF 28 is implemented with one or more physical devices that are external to the switch 21, but within the same end office that houses the corresponding switch(es) 21. The reason for the co-location is that the sooner the TDM trunks are converted to ATM, the earlier the advantages of ATM statistical multiplexing gains are enjoyed. Because the TA-IWF 28 is physically located in the central office 20, 22, the TA-IWF 28 must meet the central office environmental requirements. In a preferred embodiment, network equipment building standards (NEBS) level 3 is satisfied.

Preferably, the TA-IWF 28 scales from less than 100 to 16,000 trunks; however, as new processors are developed, capacity will increase. According to a preferred embodiment, the interface is T1, T3, and OC-3 compatible on the TDM end and DS-3, OC-3, and OC-12 compatible on the ATM side. Preferably the ATM signals are UNI 3.1, UNI 4.0, or PNNI 1.0 on the ATM side. Each call is carried by an ATM switched virtual connection setup via signaling. The TA-IWF 28 acts as a multiplexer as opposed to a switch. That is, the switching function is not placed within the TA-IWF 28. The switching function can instead be placed within the A-IWF 27, which could also perform the functions of the TA-IWF 28.

Multiple implementations are possible for the TA-IWF 28. It may be integrated into the switch 20, 22, may be integrated into an ATM edge switch, or may be provided as a stand-alone special purpose device having no switching capability. Providing the TA-IWF 28 within the ATM edge switch or as a stand-alone requires minimum or no change to existing switches 20, 22. Preferably, the TA-IWF 28 is closely co-located with the switch 20, 22 in the same end office in order to maximize trunking efficiency.

Because ATM is a packet oriented rather than circuit oriented technology, ATM must emulate circuit characteristics in order to carry constant bit rate (CBR) traffic such as voice. This emulation is referred to as a circuit emulation service (CES). The TA-IWF 28 converts between the 64 Kbps trunks and ATM cells by employing a well known method of circuit emulation that is described in "Circuit Emulation Service Interoperability Specification Version 2.0" by The ATM Forum Technical Committee (January 1997), which is expressly incorporated herein by reference in its entirety. Preferably, the structured digital service level 1 (DS1) nx64 Kbps service described in the CES interoperating specification is employed to connect DS1 equipment across emulated circuits carried on an ATM network. The structured DS1 nx64 Kbps circuit emulation system efficiently carries TDM trunks through the ATM trunking network. The structured DS1 CES requires ATM switches to treat one or more DS0s in a T1 circuit as individual ATM virtual connections.

According to the structured DS1 CES service, each interworking function is connected to an ATM network 26 via physical interfaces. The physical interfaces are ATM user network interface (UNI) physical interfaces that have two characteristics or requirements. The first requirement is that the ATM interface provides adequate bandwidth to carry nx64 traffic after segmentation. The second requirement is that the ATM interface must be able to convey timing traceable to a primary reference source from the ATM network to the interworking function when external connection to network timing is not supported. The interworking functions are also connected to standard constant bit rate (CBR) circuits, such as end offices 20, 22. Connected in this manner, the interworking functions extend the constant bit rate (CBR) circuit across the ATM network 26 in a manner transparent to the switches 20, 22.

An important function of the circuit emulation service operating within the TA-IWF 28 is the adaptation of circuit traffic to ATM cells. This function is called the ATM adaptation. As described above, when time division multiplexed trunks are converted to ATM cells, the ATM adaptation process occurs. More generally, ATM adaptation refers to converting non-ATM formatted information into the size and format of ATM cells. For circuit traffic such as voice to be converted into ATM format, two adaptation layers that can be suitably used are ATM adaptation layer 1 (AAL1) and ATM adaptation layer 2 (AAL2). However, the present invention is not limited to AAL1 and AAL2 and other layers that can satisfactorily convert the traffic into ATM cells, such as AAL5, may be employed.

According to one embodiment, the structured DS1 nx64 Kbps circuit emulation service employs AAL1 such that circuit traffic is treated as constant bit rate (CBR) traffic within the ATM switching system. However, the system is not limited to AAL1 and other protocols such as AAL2 may be adopted to incorporate bandwidth saving features such as voice compression and silence suppression, which can further improve bandwidth efficiency.

AAL1 has been standardized in both International Telecommunications Union Telecommunication (ITU-T) and American National Standards Institute (ANSI) since 1993 and is preferred for use with circuit emulation services due to its simplicity. AAL1 is designed to support constant bit rate services and allows the specification of peak cell rate, cell loss ratio, and cell delay variation. Depending on implementation, the peak cell rate bandwidth may be dedicated or guaranteed.

There is a difference between dedicated and guaranteed bandwidth. When the peak cell rate bandwidth is said to be dedicated to the constant bit rate service, no other services can utilize any of the constant bit rate's bandwidth, even if it is not utilized by the constant bit rate service itself. However, if the peak cell rate bandwidth is guaranteed to the constant bit rate service, the unused portion of the constant bit rate's dedicated bandwidth can be utilized by other services, so long as the other services agree to return the bandwidth when the constant bit rate service needs it.

AAL1 introduces additional delay because each AAL1 ATM connection carries information for only a single user. With voice input at 64 Kbps, it takes 5.875 milliseconds, or approximately six milliseconds to fill an AAL1 payload of an ATM cell.

One alternative to AAL1 is AAL2. AAL2 started as a contribution to committee T1S1.5, an ANSI standards subcommittee. AAL2 was later introduced to the ITU-T Study Group 13 on May, 1996 under the temporary name of AAL-CU where CU stood for composite user. AAL2 has now been defined in the ITU-T Recommendation 1363.2.

AAL2 enables voice to be carried as variable bit rate (VBR) data while maintaining its delay sensitive nature. AAL2's support for variable bit rate (VBR) traffic allows many bandwidth saving features, such as voice compression and silence suppression to be employed. These features are discussed in more detail below.

AAL2 enables multiple users to share a single ATM connection, while allowing each user to select a potentially different quality of service parameter. The structure of AAL2 also allows for the packing of short length packets into one or more ATM cells. In contrast to AAL1, which has a fixed payload size, AAL2 offers a variable payload within cells and across cells. The variable payload provides a dramatic improvement in bandwidth efficiency of the structured circuit emulation over AAL1.

An important aspect of AAL2 is the packet fill delay parameter. The packet fill delay parameter allows the network operator to set a time period during which AAL2 protocol data units are assembled and then segmented into ATM cells. The setting of this parameter allows the network operator to control the cell construction delay. This allows the operator to trade off delay and bandwidth efficiency in order to meet the delay requirements of some voice connections. For example, for 64 Kbps pulse code modulation (PCM) voice to fill up an ATM cell, it takes six milliseconds. AAL2 can reduce this delay by half by setting the packet fill delay to 3 milliseconds, which would result in each ATM cell payload being half filled. Thus, 50% bandwidth loss is traded for 50% less delay.

Essentially what AAL1 or AAL2 allow is the choice of carrying voice trunks through an ATM network as constant bit rate traffic or variable bit rate traffic. If voice is sent as constant bit rate traffic, then ATM Forum's structured DS1 nx64 Kbps circulation emulation service using AAL1 is employed. If voice is sent as real time variable bit rate traffic, then AAL2 as the ATM adaptation layer is employed, thus taking advantage of the many efficiency and performance enhancing features supported by AAL2.

Control and Signaling Interworking Function

The function of the CS-IWF 30 is to bridge between narrowband signaling in the PSTN and broadband signaling within the ATM network 26. Two types of interoffice signaling methods are employed in present day networks, common channel signaling (CCS) (i.e., narrowband signaling) and channel associated signaling (CAS). CAS is an older kind of signaling in which signaling information is carried in the same bearer channel as the user information and is of little concern to the present invention.

Because the dominant interoffice signaling protocol currently in use is Signaling System 7 (SS7), the CS-IWF 30 is provided for interacting with SS7 and enabling support of SS7 within the ATM network 26. SS7 is a common channel signal (CCS) protocol for call control information. The protocol is transported via a physically separate network from that of the voice bearer channels.

Figure 2:
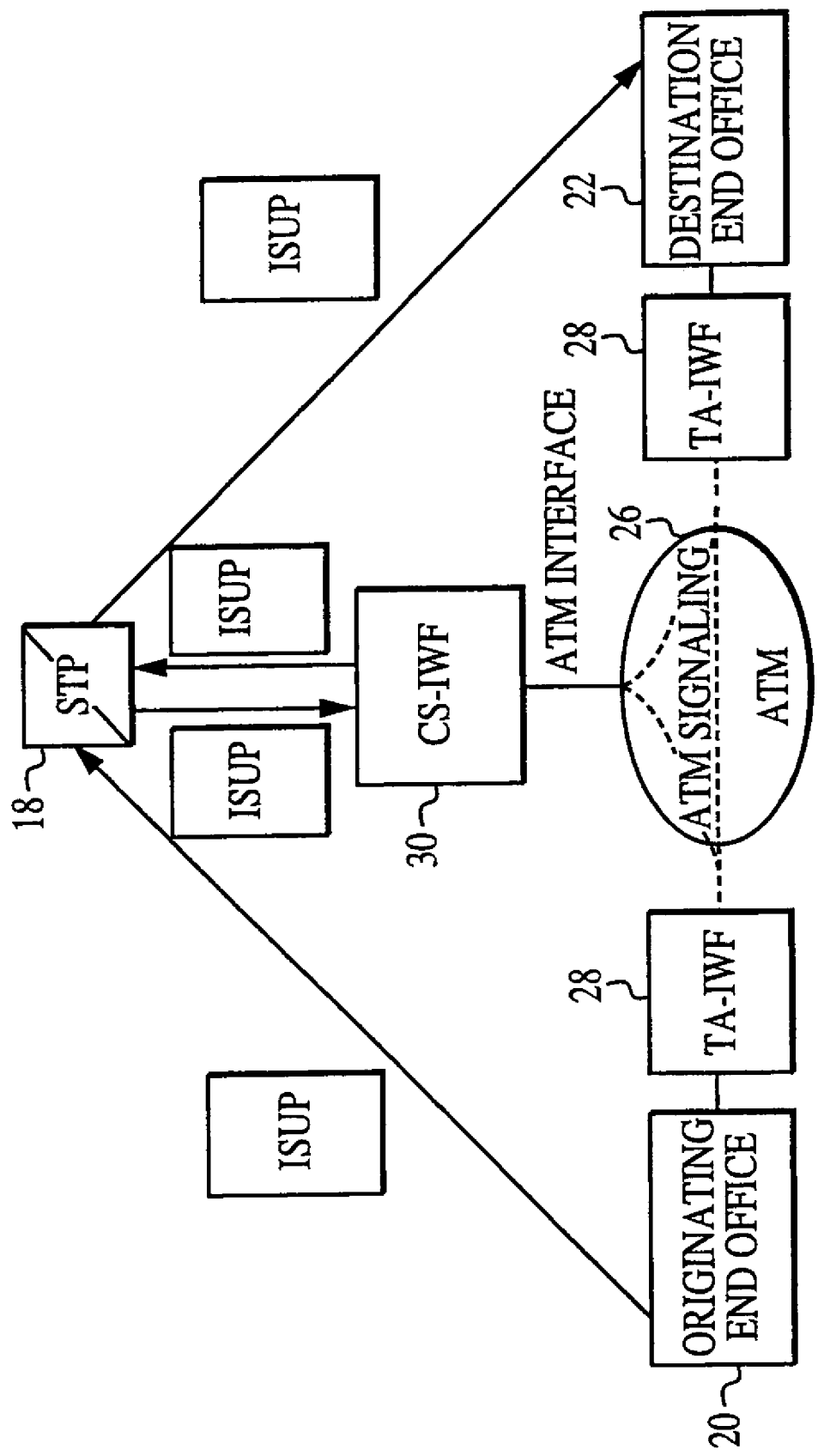
FIG. 2 shows an exemplary architecture of an ATM-based distributed virtual tandem switching system including an out-of-band signaling network, according to an aspect of the present invention.

With reference to FIG. 2, explanation is provided as to how the present invention supports the SS7 signaling within the ATM network 26 by preserving the existing SS7 signaling process and the ISUP message integrity. The originating Class 5 switch within end office 20 sends its ISUP message to the signaling transfer point 18. Subsequently, the signaling transfer point 18 forwards the message to the CS-IWF 30, which translates incoming ISUP messages and controls the TA-IWF's 28 call setup procedure. For example, the unique point codes are translated into ATM addresses for the originating and terminating TA-IWFs 28. An ATM connection is then established between the two TA-IWFs 28 via an ATM signaling protocol, such as broadband-ISDN user part (B-ISUP) defined by the ITU-T, PNNI defined by the ATM Forum, or UNI 3.0, 3.1, 4.0 defined by the ATM Forum. On the destination side, the CS-IWF 30 composes an ISUP message and sends it to the signaling transfer point 18, which then completes the connection setup with ISUP messages to the destination end office 22.

An exemplary call flow according to the present invention is now described with reference to FIG. 2. A more detailed explanation can be found, however, in U.S. patent application Ser. No. 09/287,092. After the originating end office 20 (i.e., the Class 5 switch) creates an ISUP message, the originating end office 20 sends the ISUP message to the signaling transfer point 18. The signaling transfer point 18 routes the ISUP message to the CS-IWF 30 via a set of A-links (connections between the end office and the STP). At the CS-IWF 30, the ISUP message is processed and call control information is distributed to the TA-IWFs 28 via the ATM network 26. The CS-IWF 30 also formulates an ISUP message regarding the receiving trunk and sends it back to the signaling transfer point 18. The signaling transfer point 18 routes the ISUP message to the terminating end office 22. The terminating end office 22 then reserves the corresponding trunk. At this point, an ATM virtual connection can be established between the TA-IWFs 28 to carry the voice traffic. Thus, the CS-IWF 30 converts between narrowband and ATM signaling to establish connections. The ATM virtual connections are dynamically set up by the system via signaling, as described below with reference to the SVCs. Although the signaling protocols must be standards based, such as ATM UNI or PNNI, the exact protocol may vary among implementations.

Transporting the ISUP messages from the end offices 20, 22 can be accomplished in two ways. The ISUP messages can be carried in the SS7 network without change, or the ISUP messages can be carried in the ATM network in a special ATM connection. According to one embodiment, the ISUP messages are carried in the SS7 network because it simplifies the TA-IWF's 28 responsibility and preserves the out of band nature of the SS7 signaling network.

The CS-IWF 30 should have a unique point code, even for a system with a redundant pair of CS-IWFs. Two sets of T1 interfaces to a mated pair of signaling transfer points should also be provided. In addition, an ATM OC-3 user to network interface (UNI) to the ATM network should be provided. Preferably, the CS-IWF 30 supports a trunking network of at least 500,000 trunks and is able to connect 3,000,000 calls in a busy hour. As new processors are developed, capacity will increase. The CS-IWF 30 should preferably (but not necessarily) be a standalone, special purpose device.

In one embodiment, the CS-IWF 30 employs a server farm concept, described with reference in FIG. 3. The server farm concept allows for commercial grade computers meeting standards applicable for telephone switching systems to perform control and administrative functions for the ADNSS. The following is a discussion of exemplary basic functionality necessary for telephone switching for lines and trunks.

Figure 3:
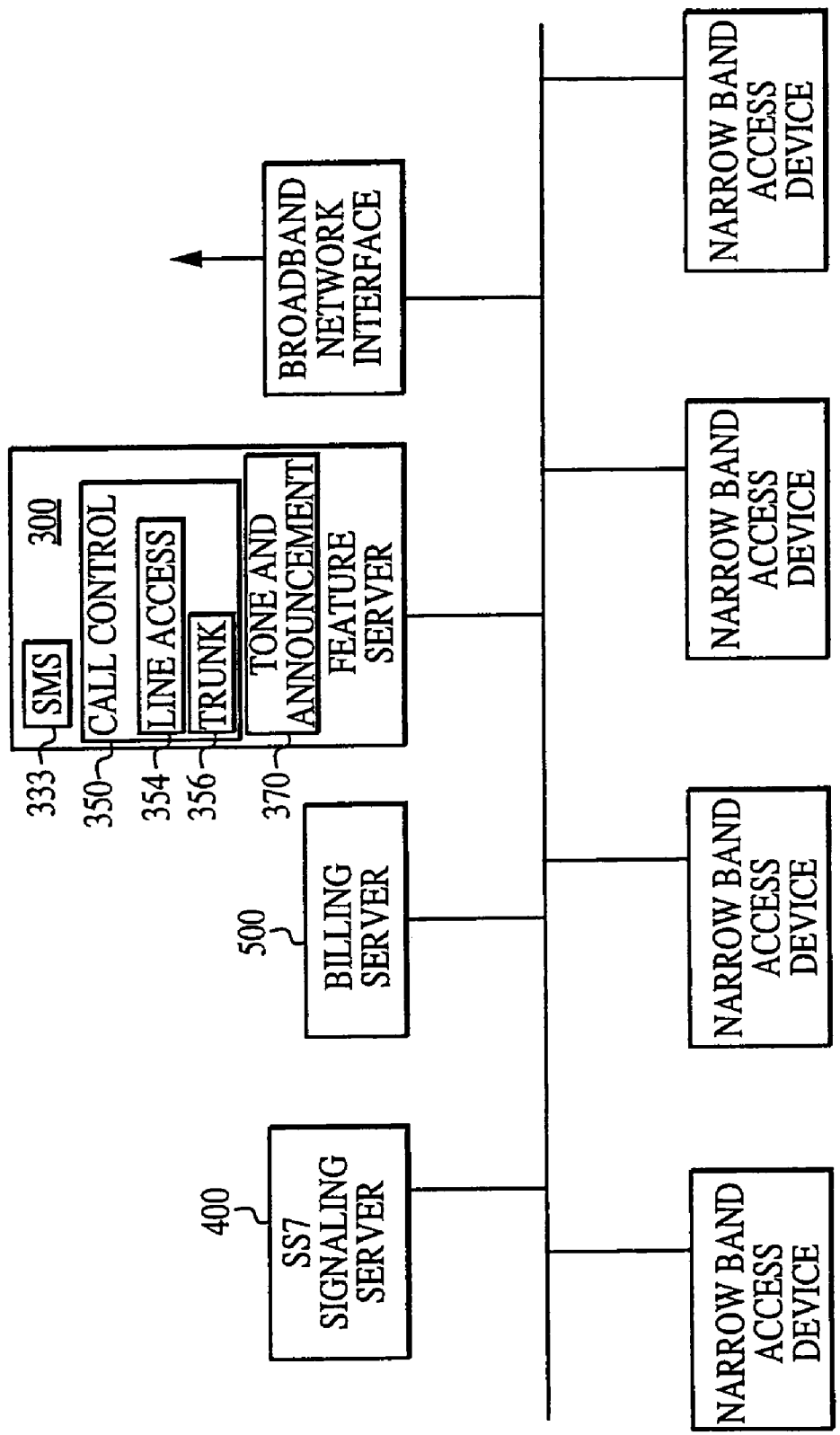
FIG. 3 show an exemplary server farm, according to an aspect of the present invention.

FIG. 3 is a drawing of the call control and (operations, administration, maintenance, and provisioning) OAM&P connectivity within the geographically distributed ADNSS. The connectivity of functions is shown as a LAN/WAN arrangement although alternate connectivity is also possible. The boxes shown are intended to be functional with the feature server 300 performing specific functions dependent upon software load. The server farm also includes a signaling server function 400, a billing server 500, multiple narrowband access devices, and a broad band network interface.

The feature server 300 can be further divided into a switch management server function (SMS) 333 (also seen in FIG. 1) performing OAM&P, a call control server function 350 performing call control, and a tone and announcement server function 370 providing telephone network tones and announcements. The call control function can be further divided into line access 354 and trunk access 356 call processing servers. This server farm concept allows the product user flexibility in the selection of deployable feature set software while maintaining one or more common commercial hardware platform(s) on which the software runs.

The trunk access call processing server (TACPS) function 356, relates directly to Class 5 telephone switch trunk access functionality. Features supported by the Class 5 telephone switch are supported on the ADNSS. This server function performs all device control and call processing functions for the TA-IWF 28.

The line access call processing server (LACPS) function 354 also relates directly to Class 5 telephone switch line access functionality. Services and features supported by the Class 5 switch are supported on the ADNSS. This server function performs all device and call control for the LA-IWF 27.

The switch management server (SMS) 333 provides the switch operation, administration, maintenance, and provisioning (OAM&P) functionality. From this functional platform the user is able to deploy and activate the building block units of the ADNSS. It serves as the single point of interface for all Operations Support Systems (OSS). The SMS 333 collects performance data and traffic measurements and provides report generation capability for these data. The function also collects alarm indications generated by peripheral units of the ADNSS and formats them so that they are easily interpreted by maintenance personnel. The server acts as the maintenance interface to the ADNSS peripherals units for diagnoses of system troubles and software updates of system software.

The network tones and announcement server function 570 provides a platform that is common to all ADNSS peripheral units. It provides, as necessary, the network based tones currently provided by the Class 5 switch. Example tones include the 120 IPM (impulses per minute) busy tone and 60 IPM busy tone. The function should provide Class 5 switch generic network announcements as well as provide an interface to provide customized customer announcements. An example of a generic announcement is the vacant code, i.e., the number dialed is not a working number.

The signaling server function 400 is the point of interface to the narrowband common channel Signaling Signaling System 7 (CCSSS7) network. This server function provides the message interworking between the narrowband SS7 Integrated Services Digital Network User Part (ISUP), Transaction Capabilities Application Part (TCAP), Local Number Portability (LNP) database, and Advanced Intelligent Network (AIN) databases and the ADNSS feature server functions. The signaling network gateway function 400 thus allows the ADNSS feature server 300 to launch transactions to all of the services associated with these components.

The billing server function 500 creates or collects call detail records for all call attempts through the ADNSS. These call attempts include all short duration, long duration, and normal calls. Short duration calls are usually less than a few seconds whereas long duration calls extend over the midnight time boundary. This function is the single point of interface for bulk billing collector systems and provides the various formats the different collectors require. The most prominent example of one such function that could be employed is Bellcore AMA Format (BAF).

The narrowband access devices include the A-IWF. It allows for multiple types (POTS, ISDN, xDSL, etc.) of access to the broadband network. The broadband network interface includes transport devices (ATM switches, Frame Relay switches, etc.) that provide switching and transport of packet traffic between two distant points.

From an implementation point of view, the TA-IWF 28/LA-IWF 27 and the CS-IWF 30 can be separate. In the illustrated embodiment, the CS-IWF 30 centrally serves multiple LA-IWFs 27 and TA-IWFs 28. Alternatively, one CS-IWF 30 may serve a respective one TA-IWF 28/LA-IWF 27.

Line Access Interworking Function

The line access interworking function (LA-IWF) is the gateway that allows any standard telephony or data circuit type access to interface into the distributed switching fabric of the ADNSS. The LA-IWF in the ADNSS functions as the interface for multiple two or four wire loop customer premise devices that provide POTS, ISDN, Coin and xDSL telephony services. This unit provides Class 5 telephone switch subscriber line BORSCHT functionality to these interfaces. Examples of BORSCHT functions are:

B—Battery supply to subscriber lines.
O—Over-voltage protection, i.e., line card secondary protection.
R—Ringing current supply, i.e., power ring.
S—Supervision of the subscriber device, i.e., the line scanning function that detects requests for service.
C—Coder/decoder functions, i.e., the analog to digital conversion.
H—Hybrid, i.e., the 2 wire to 4 wire conversion.
T—Test, i.e., test access to physical facility as well as digital test access when necessary.

Other functions performed by this unit may include: dial tone generation to alert the customer that the system is prepared to receive dialed digits; dial pulse or dual tone multi-frequency recognition devices to decode dialed digits; and hairpin capability for calls to another subscriber on the same unit. The LA-IWF may also perform a function to provide nailed up connection capability. That is, under the control of provisioning from the SMS, an SVC is set up from access interface to access interface between units within the ADNSS. This SVC will stay active until disconnected by SMS provisioning and will recover automatically from any network fabric fault along its route.

The LA-IWF can act as a Service Access Multiplexer (SAM) under the control of the CS-IWF without having the limitations associated with the SAM. That is, although the SAM is service specific, limited to interfacing ATM with either ATM or frame relay, and only functions with private lines, the LA-IWF operates with any kind of access. The LACPS function of the CS-IWF provides device control and call processing functions for the LA-IWF. An industry standard call control protocol is employed between the LACPS and LA-IWF. Examples are: the ITU's H.323; the emerging Session Initiated Protocol (SIP); and the IETF and ITU H.248 MEGACO.

According to an aspect of the present invention, the TA-IWF is expanded and evolves into the LA-IWF, making the architecture a true network switching system for any type of access.

According to an embodiment of the present invention, silence suppression can be employed. Silence suppression is a mechanism for saving extra network bandwidth by not transmitting the pauses in a voice conversation into the network. Silence suppression can be employed on the sender's end by not generating voice samples when the speech level is below a given threshold. With adaptive differential pulse code modulation (ADPCM), the silence suppression results in fewer bits per sample during speech inactivity. Silence suppression can be performed in an ATM trunking network, for example, by a voice module on an ATM edge switch. The voice module detects silence and stops the transmission of these silent intervals into the ATM network.

Silence suppression also suffers from side effects. For example, because silence suppression removes background noise, a listener may think that the line has been disconnected when a pause in the conversation occurs. Silence suppression also increases the ATM cell construction delay and adds variability to the delay. Silence suppression should always be disabled when fax or modem tones are detected. For ATM trunking, the silence suppression feature is not required; however, the availability of silence suppression does improve network efficiency.

Voice compression is another way of saving network bandwidth. Voice compression employs algorithms such as ADPCM to reduce standard PCM 64 Kbps voice tone to 32 Kbps, 24 Kbps, 16 Kbps, or even 8 Kbps. However, the side effects of voice compression are degraded voice quality and increased ATM cell construction delay. As with silence suppression, voice compression is not required but may be employed in an embodiment of the present invention.

ATM trunking for narrowband services introduces delay additional to the delay caused by transport over the ATM network. The additional delay is primarily associated with buffering to accommodate cell delay variation introduced by the ATM network and cell construction delay. Thus, the three types of delay that voice traffic may experience when carried by an ATM network are: ATM switch and network transit delay, buffering delay in the ATM switch to accommodate cell delay variation, and ATM cell construction delay. While the first two types of delay are dependent on switch design, physical medium, distance, and traffic condition, etc., the ATM cell construction delay, when employing the AAL1 circuit emulation service, is fixed. As mentioned above, for 64 Kbps pulse code modulated (PCM) voice, it takes six milliseconds to fill an ATM cell with a single voice channel. The total echo path time is thus 12 milliseconds plus additional transit and buffering delays. For compressed voice, for example 32 Kbps using ADPCM, the delay will be doubled to 24 milliseconds because it now takes twice as long to fill an ATM cell with the speech data of a single voice channel.

In order to counteract excessive delay, appropriate echo control measures are employed on all speech connections where end delay is significant. According to a preferred embodiment, an active echo control device is employed on all connections that exceed the total one way talk or echo transmission path of 25 milliseconds.

ATM Based Network Fabric

The ATM network 26 will now be discussed. From a physical connection point of view, the ATM trunks between switching offices may be set up with direct point-to-point fibers or by means of a synchronous optical network (SONET) ring. Logically, however, ATM allows the interoffice trunks to be set up in many different ways. Thus, within the ATM switching network 26, originating and terminating trunks are preferably connected by means of virtual connections set up in one of three ways.

According to a preferred embodiment of the invention, individual switched virtual connections (SVC) are provided in which an ATM switched virtual connection is established for each nx64 Kbps call. When utilizing individual switched virtual connections, the switched virtual connections are dynamically provisioned via signaling and a peak cell rate is set equal to nx64 Kbps. Available ATM network bandwidth that would otherwise be dedicated to carrying voice traffic can be utilized by other data applications on a dynamic basis. Individual switched virtual connections have the advantage that they are automatically set up, and on demand provisioning results in trunk bandwidth efficiency.

According to another embodiment, a mesh permanent virtual path (PVP) is provided. The mesh permanent virtual path establishes an ATM permanent virtual path across the ATM tandem network between every two end offices. Thus, the permanent virtual paths are manually provisioned with a peak cell rate equal to the size of the existing trunk group between the two end offices. As with individual switched virtual connections, available ATM network bandwidth that would otherwise be dedicated to carrying voice traffic can be utilized by other data applications on a dynamic basis. Among the advantages of the mesh permanent virtual path are that little or no signaling is required, depending upon how many virtual connections are used within the permanent virtual paths. That is, all that is required is getting allocated within a path: no set up is required. In addition, every end office perceives direct trunks with every other end office. However, the mesh permanent virtual path requires manual provisioning and the preallocated and guaranteed constant bit rate bandwidth reduces trunk bandwidth efficiency.

According to yet another embodiment, a star permanent virtual path can be provided. With a star permanent virtual path, a single ATM permanent virtual path is established between each end office and the ATM tandem network. The permanent virtual path is manually provisioned such that only one permanent virtual path is provisioned and a peak cell rate is set equal to the sum of all the trunks of the end office. As with the other two systems, available ATM network bandwidth that would otherwise be dedicated to carrying voice traffic can be utilized by other data applications on a dynamic basis. Similar to the mesh permanent virtual path, the star permanent virtual path has the advantage of little or no signaling, depending on if and how virtual connections are used in the permanent virtual path. Moreover, each end office perceives a single tandem trunk. In addition, switch translation is easy because it appears that a single trunk leaves each end office. Thus, all traffic is directed to that trunk group. However, the star permanent virtual path has the drawbacks of manual provisioning, and preallocated and guaranteed constant bit rate bandwidth reduces trunk bandwidth efficiency.

The star permanent virtual path and the mesh permanent virtual path remove the majority of the call setup load from the switch by utilizing manually provisioned permanent virtual paths. Utilizing the individual switched virtual connection increases call setup load due to the elimination of direct trunks.

When the TA-IWF is combined with the LA-IWF, the present invention allows for savings in three broad categories: end office trunk termination reduction and/or growth offsets, bandwidth reduction on transport facilities associated with end office trunk termination reduction, and administrative savings associated with trunk forecasting and trunk record keeping.

The use of large trunk groups according to the present invention creates an increased carrying capacity that results in a reduction in end office trunk unit requirements. The reduction allows for a decrease in capital outlays for trunk units and/or allows for more rapid response to the increasing trunk requirements brought about by new traffic such as Internet access traffic.

Bandwidth reduction on transport facilities also occurs because current interoffice trunks utilize bandwidth whether the trunk is in use or not. The present invention permits trunks to utilize bandwidth on transport facilities only when the trunk is in use. When the trunk is idle, no bandwidth on the transport facility is required. During low traffic periods such as late evenings and early mornings, available bandwidth on the transport facilities could increase in excess of 50%. Consequently, the bandwidth is available for other applications, such as data or file transfers.

Administrative savings are realized in two areas, trunk forecasting and trunk record keeping. The nature of trunking today requires huge investments in hardware and software for systems to keep track of individual interoffice trunks. The present invention reduces the need for such detailed record keeping by individual trunks because the trunks are virtual. Therefore, individual trunks spanning the network exist only when the calls are in progress. Consequently, keeping records on individual interoffice trunks can be drastically reduced.

Trunk forecasting and provisioning for thousands of individual trunk groups can be reduced to just a few trunk groups per end office or no trunk groups when network based call centers are employed. Call loads for the end office can be used to forecast trunk requirements rather than requiring individual trunk and trunk group measurements. Data collection can also be simplified due to a reduction in the amount of data needed to accurately measure office carrying capacity loads.

The ADNSS is based on the existing generic switching system architecture. In other word, the ADNSS has the three basic functions of a switch: administration and control performed by the CS-IWF; network fabric functions performed by the distributed partial mesh ATM switches; and peripheral interface units consisting of the LA-IWF and TA-IWF units.

Initially, the TA-IWF performs the trunk interface and TDM to ATM circuit emulation service (CES) function. The TA-IWF supports TDM transmission rates from DS1 up through direct interfaces. It also supports ATM transmission rates from DS3 up through direct interfaces.

The LA-IWF supports line access functions for, inter alia, Plain Old Telephone Service (POTS), ISDN Digital Subscriber Line, Coin and the xDSL family of data access lines. For the xDSL line, the LA-IWF supports the data channel to the data network. The function of the LA-IWF unit is based on the card type, (personality cards) populated in application card slots on the unit. The LA-IWF can also incorporate the trunk interface functions as well as private line and wireless access. That is, it is contemplated that the LA-IWF and TA-IWF units could merge into a common platform that would perform the access and trunk functions of the telephone switch as well as private line access and wireless telephony access.

The LA-IWF unit provides the advantages of facilitating the development of the virtual central office concept. This virtual central office allows movement away from the traditional geographic bounded CO that dominates the industry today. By removing these boundaries the need for Digital Loop Carriers (DLCs) and other remote telephony units will disappear. The boundaries of the virtual central office will now extend to the controlled environment vault (CEV) of the carrier serving area (CSA) and to the customer premises for medium and large customers.

Call Flows

Trunk Access

Figure 4:
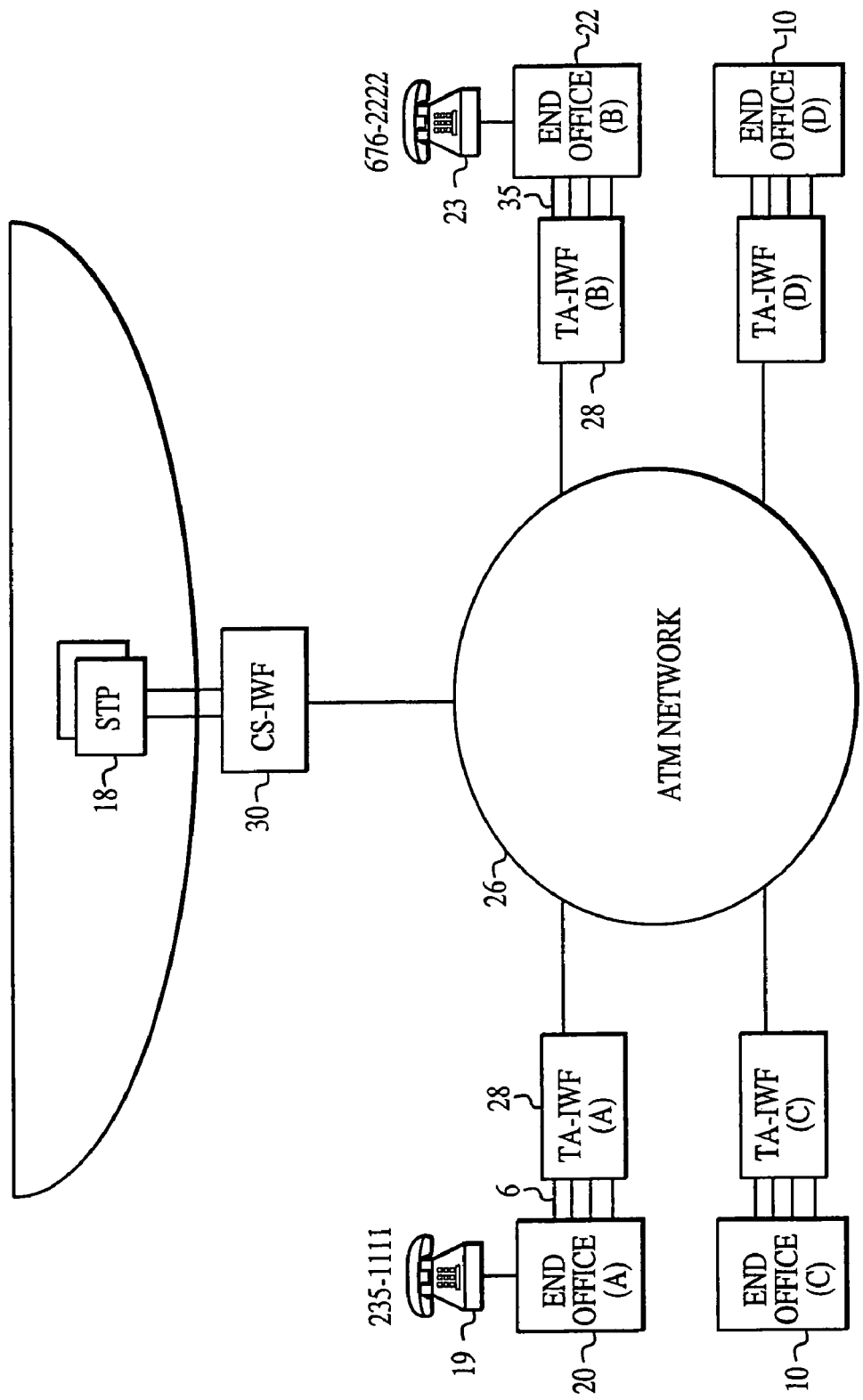
FIG. 4 illustrates an exemplary trunk group architecture, according to an aspect of the present invention.

A call flow scenario for trunk access is now described with reference to FIG. 4. Initially, a calling party 19, e.g., 235-1111 dials a destination 23, e.g., 676-2222. The calling party's end office 20 (end office A) collects the dialed digits corresponding to the called number and checks routing tables to determine the end office that is connected to the dialed destination. After determining the destination end office 22 (end office B), end office A finds a trunk (e.g., trunk 6) connecting to end office A's TA-IWF 28. Assuming that the trunk is idle, end office A reserves trunk 6.

End office A then initiates an SS7 IAM message containing, among other information, the following: signaling transfer point routing address of the CS-IWF 30; calling telephone number; called telephone number; and trunk identification (CIC) for trunk 6. After the signaling transfer point 18 receives the IAM message, the signaling transfer point 18 forwards the message to the CS-IWF 30. The CS-IWF 30, based on the calling telephone number, identifies the originating TA-IWF 28 (TA-IWF A) with its ATM address or other identifier. The CS-IWF 30 then sends the CIC to TA-IWF A via an ATM message through the ATM network (i.e., in-band signaling). The CS-IWF 30, based on the called telephone number, identifies the destination TA-IWF 28 (TA-IWF B) with its ATM address or other identifier. The CS-IWF 30 then sends a request to TA-IWF B for an idle trunk, via an ATM connection (i.e., inband signaling) in the ATM network 26.

TA-IWF A receives the message from the CS-IWF 30, and based on the received CIC, determines the corresponding DS0 channel on its line interfaces. TA-IWF B also receives a request from the CS-IWF 30. Accordingly, TA-IWF B finds an idle DS0 channel on its line interfaces and reserves it, e.g., trunk 35. TA-IWF B determines the CIC for this DS0 and sends the CIC to the CS-IWF 30 via an ATM message.

The CS-IWF 30 receives the message from TA-IWF B and sends an IAM message to the signaling transfer point 18 containing, among other information, the following: signaling transfer point routing address of end office B; calling telephone number; called telephone number; and trunk identification (CIC). The signaling transfer point 18 receives the IAM message and forwards it to end office B.

End office B receives the IAM message and uses the received CIC to reserve the corresponding trunk, e.g., trunk 35. End office B checks the called telephone number for on-hook and active call features. End office B holds the line, applies ringing to the line and a ring tone to trunk 35 (assuming that 676-2222 is on-hook). End office B then connects the line to trunk 35 and initiates an SS7 ACM message to the signaling transfer point 18.

The signaling transfer point 18 receives the ACM message and forwards it to the CS-IWF 30. When the CS-IWF 30 receives the ACM message, the CS-IWF 30 sends the message to TA-IWF A, requesting that TA-IWF A establishes an ATM connection with TA-IWF B or vice versa. That is, TA-IWF B can establish a connection with TA-IWF A.

In response to the received message, TA-IWF A establishes a 64 Kbps CBR connection with TA-IWF B. TA-IWF A also maps the appropriate DS0 to the outgoing switched virtual connection. At the same time, TA-IWF B associates the incoming switched virtual connection to the corresponding DS0. After the connection is established, TA-IWF A sends an ATM message to the CS-IWF 30, indicating the establishment of the ATM connection.

The CS-IWF 30 receives the message from TA-IWF A 28 and the CS-IWF 30 sends an ACM message to the signaling transfer point 18. The signaling transfer point 18 receives the ACM message and forwards it to end office A. End office A receives the ACM message from the signaling transfer point 18 and connects 235-1111 to trunk 6.

Consequently, the calling party 19 at 235-1111 hears the ringing tone. When the destination 23 at 676-2222 picks up the phone, end office B detects the off-hook and removes the ringing tone. End office B then initiates an ANM message to the signaling transfer point 18. The signaling transfer point 18 receives the ANM message and forwards it to the CS-IWF 30. The CS-IWF 30 receives the ANM message from the signaling transfer point 18 and initiates an ANM message to the signaling transfer point 18.

The signaling transfer point 18 receives the ANM message from the CS-IWF 30, and forwards it to end office A. End office A receives the ANM message from the signaling transfer point 18 and starts necessary billing measurement. Finally, the calling party 19 at 235-1111 talks to the destination 23 at 676-2222. A more detailed description of the call flow described above appears in parent U.S. patent application Ser. No. 09/287,092.

Line Access

Figure 5:
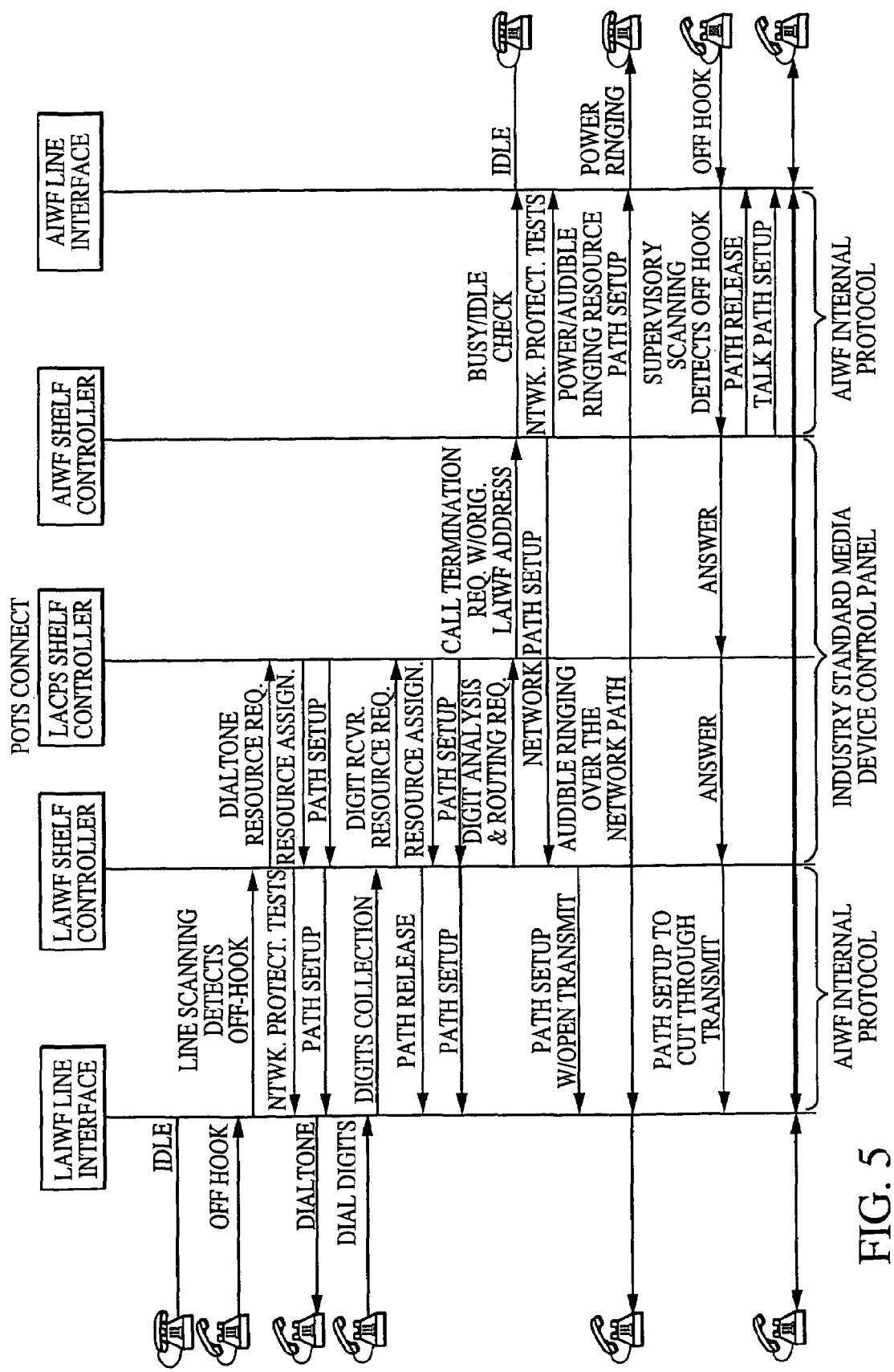
FIG. 5 shows a call flow diagram for a POTS connection setup, according to an aspect of the present invention.

FIG. 5 is an example of a POTS call flow for setting up a connection, according to an embodiment of the present invention. Although the call flow is similar to a standard call flow, the components executing the process are novel. In the following description, the LA-IWF is discussed as two separate components: the personality card or line interface; and the LA-IWF Processor, or brains of the LA-IWF. Initially, the originating LA-IWF Processor function detects an access device request for service. With POTS, xDSL base band and Coin services the sensor is typically attached to the line that detects current flow when the telephone hand set is taken off-hook. These line sensors are scanned periodically by devices, e.g., the LA-IWF Processor, for this indication. When the LA-IWF Processor recognizes the request, it initiates the setup of a path to a tone generation device that provides dial tone. This tone device may be present in the LA-IWF or it may be a pooled resource on a server common to several or all LA-IWFs, such as the CS-IWF. Industry standard tones are provided in this manner. Any per-service initiation network protection tests should be performed during this interval.

Once dial tone is present, line supervision is passed to a device just prior to the two wire to four wire hybrid. With dial tone present at the user interface, industry standard timing is employed. Upon detection of the first dialed digit, tone or pulse, the path to the tone generator is removed (i.e., the path from the tone generator to the end user is released) and the line is connected to a decoder device that interprets the digit. Industry standard timing is employed during this process. This decoder device may be present in the LA-IWF or it may be a pooled resource on a server common to several or all LA-IWFs. Once the digits are collected they are passed to the LACPS using a standard call control protocol, e.g., ITU H.323, SIP or IETF and ITU H.248 MEGACO.

The LACPS performs routing on dialed digits and informs the originating LA-IWF of the address of the terminating LA-IWF and the port where the dialed digits reside and passes control back to the originating LA-IWF for call setup. Alternatively, the LACPS informs the terminating LA-IWF that one of its ports is being called and passes control to the terminating LA-IWF for call setup. Alternatively, the LACPS can control the entire call. These three alternatives impact where the call control intelligence and processor power should reside. The backward connect method will be now described.

When the terminating LA-IWF becomes aware of a call, the terminating LA-IWF begins the pre-ringing network integrity tests on the line while establishing the network path back to the originating LA-IWF using industry standard protocols. Once the pre-ring tests are successfully completed, power ringing is applied to the line via a resource that resides in the terminating LA-IWF. In parallel, the terminating LA-IWF provides audible ringing over the path established to the originating LA-IWF. This ringing resource resides in the terminating LA-IWF. At the originating LA-IWF the receive side of the hybrid is cut through to provide the user audible ringing.

When the called user answers, the terminating LA-IWF informs the originating LA-IWF, which cuts through the transmit side of the hybrid to allow full duplex communication. The terminating LA-IWF also informs the LACPS of the answer. The LACPS then performs the appropriate administrative measurements count update and initiates billing of the call, if required.

Figure 6:
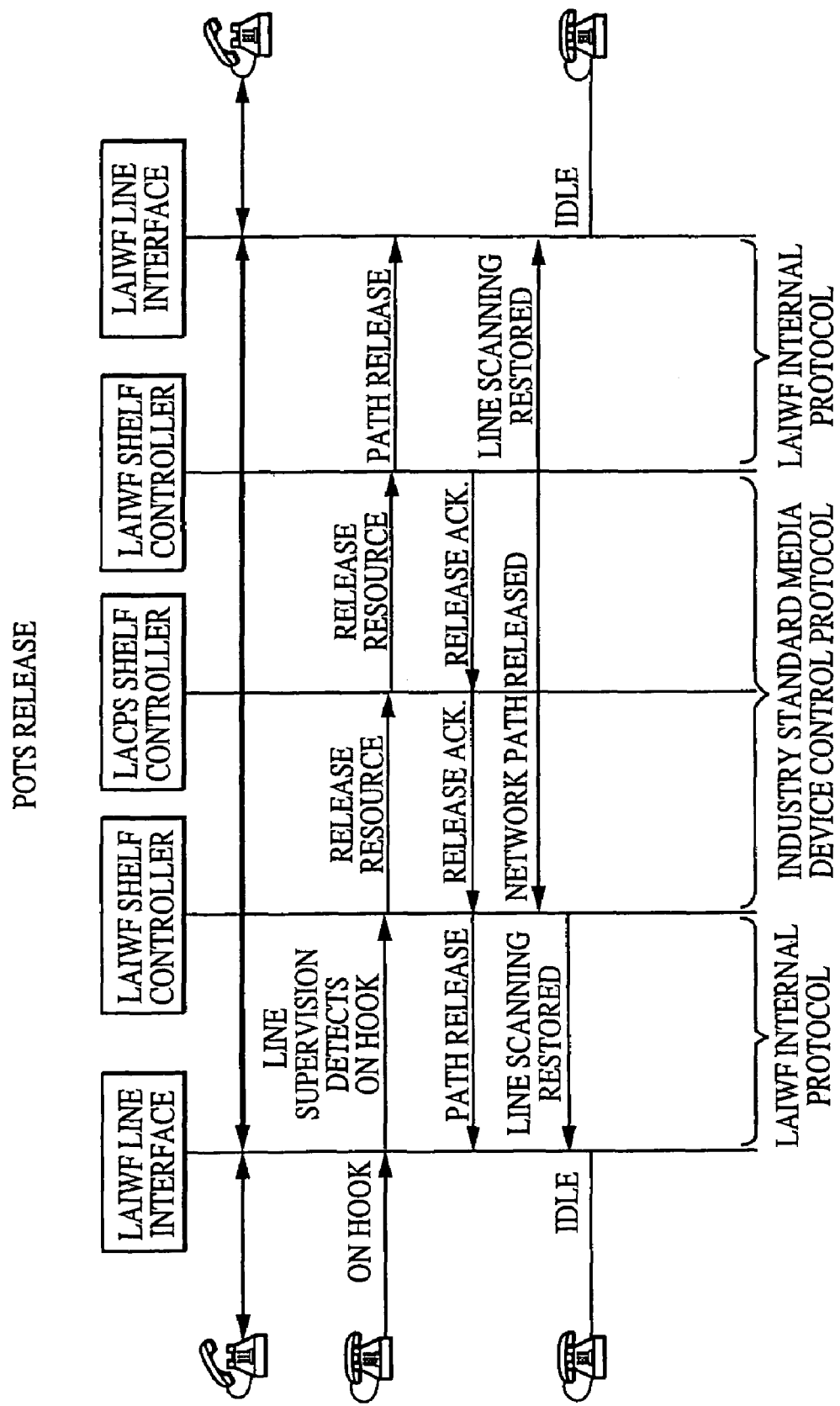
FIG. 6 shows a call flow diagram for a POTS connection release, according to an aspect of the present invention.

FIG. 6 shows an exemplary POTS call flow for releasing a line. Once the access devices ends service, e.g., hangs up the telephone, line supervision detects an on-hook condition. As a result, the originating LA-IWF releases the path. The terminating LA-IWF then sends a message acknowledging release to the originating LA-IWF, which releases its path to the line interface. Finally, after the network path has been released, line scanning is restored.

Figure 7:
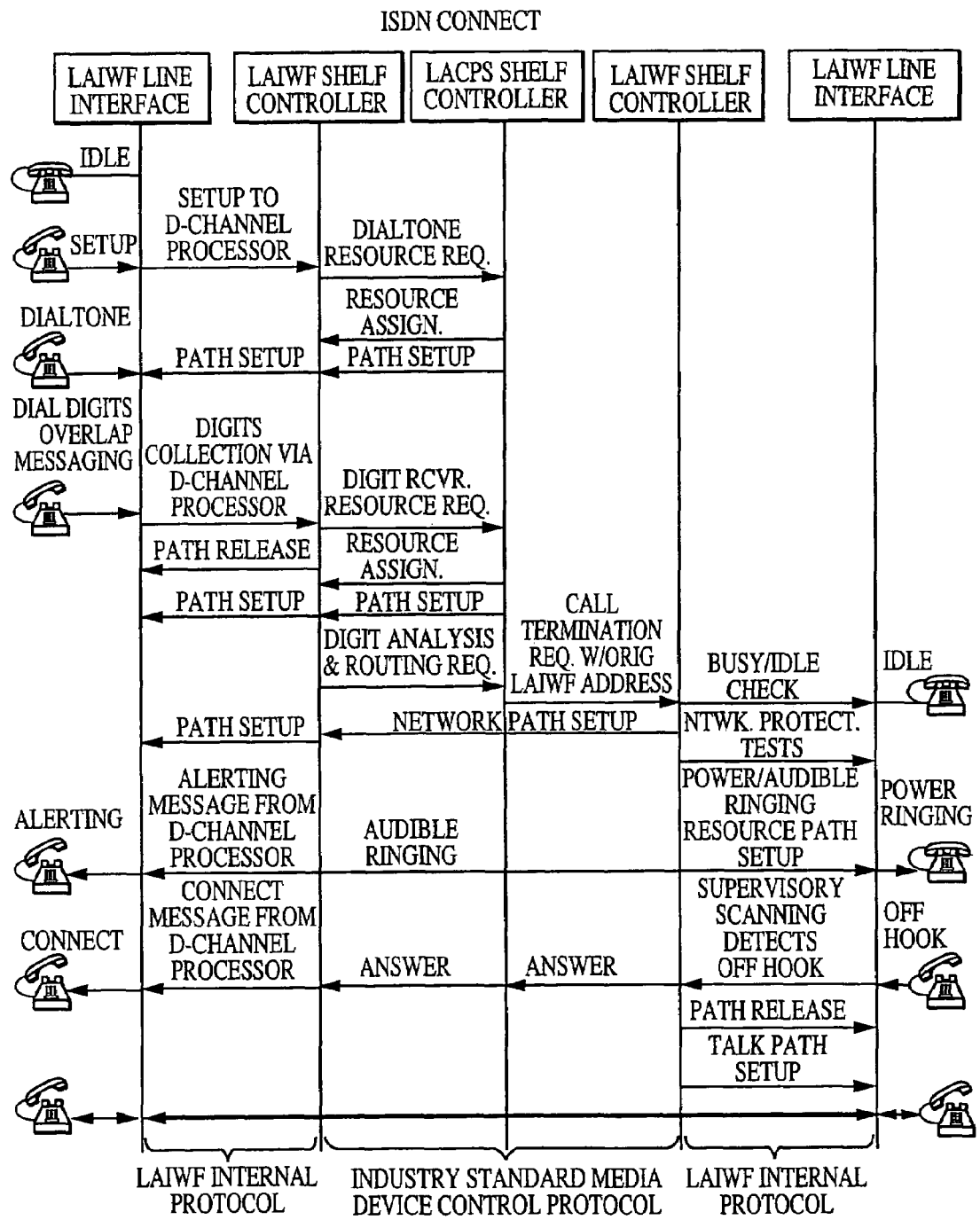
FIG. 7 shows a call flow diagram for an ISDN connection setup, according to an aspect of the present invention.
Figure 8:
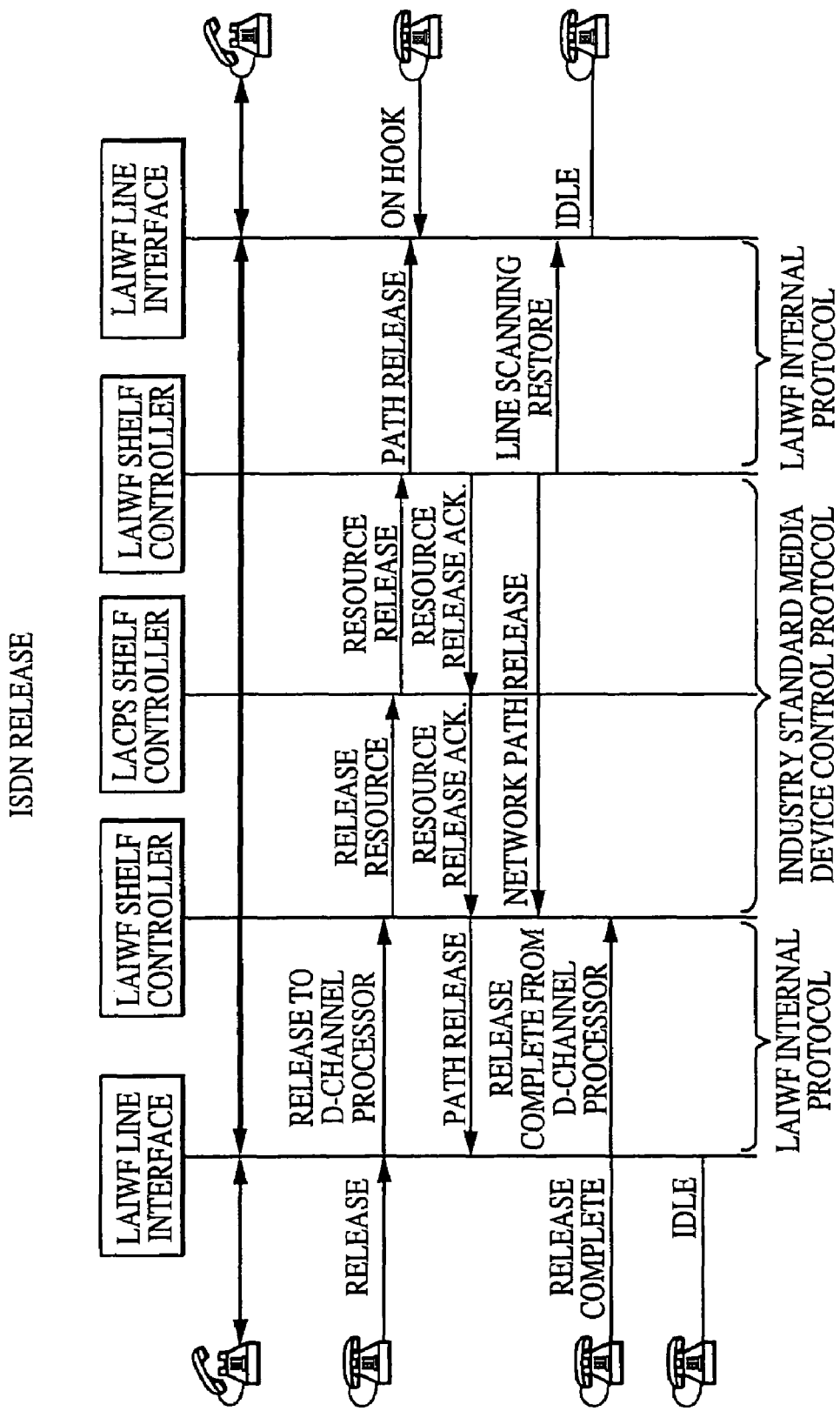
FIG. 8 shows a call flow diagram for an ISDN connection release, according to an aspect of the present invention.

FIG. 7 shows an exemplary ISDN call flow, which is similar to the POTS flow except the ISDN flow requires a D-channel processor function, which is well known, in the ADNSS architecture. This D-channel function could reside in the originating LA-IWF or LACPS dependent upon where the processing power is placed. Dial tone is supplied by the ISDN device and the well known En-bloc method of protocol message exchange could be employed. Upon receipt of the ISDN setup message, the originating LA-IWF sends the dialed number to the LACPS and the setup scenario follows the POTS flow described above. At the terminating LA-IWF the D-channel processor function sends a setup message to the ISDN device. It then follows the POTS scenario with audible ringing and answer. ISDN release, shown in FIG. 8, is similar to the POTS scenario, except that the initial release is to the D-channel processor, and after the network path has been released, a message confirming the release is sent from the D-channel processor.

Private Line Access

The present invention also has applicability in provisioning leased private lines (i.e., High Cap circuits). Provisioning leased private lines in today's network is a complicated and error prone process. Using the proposed ATM network, much of the complexity and provisioning can be eliminated, owing to ATM's capability of automatically setting up connections via signaling. Only the tail circuits at the end points need to be manually provisioned and maintained. According to this embodiment, a private line access interworking function is provided.

Figure 9:
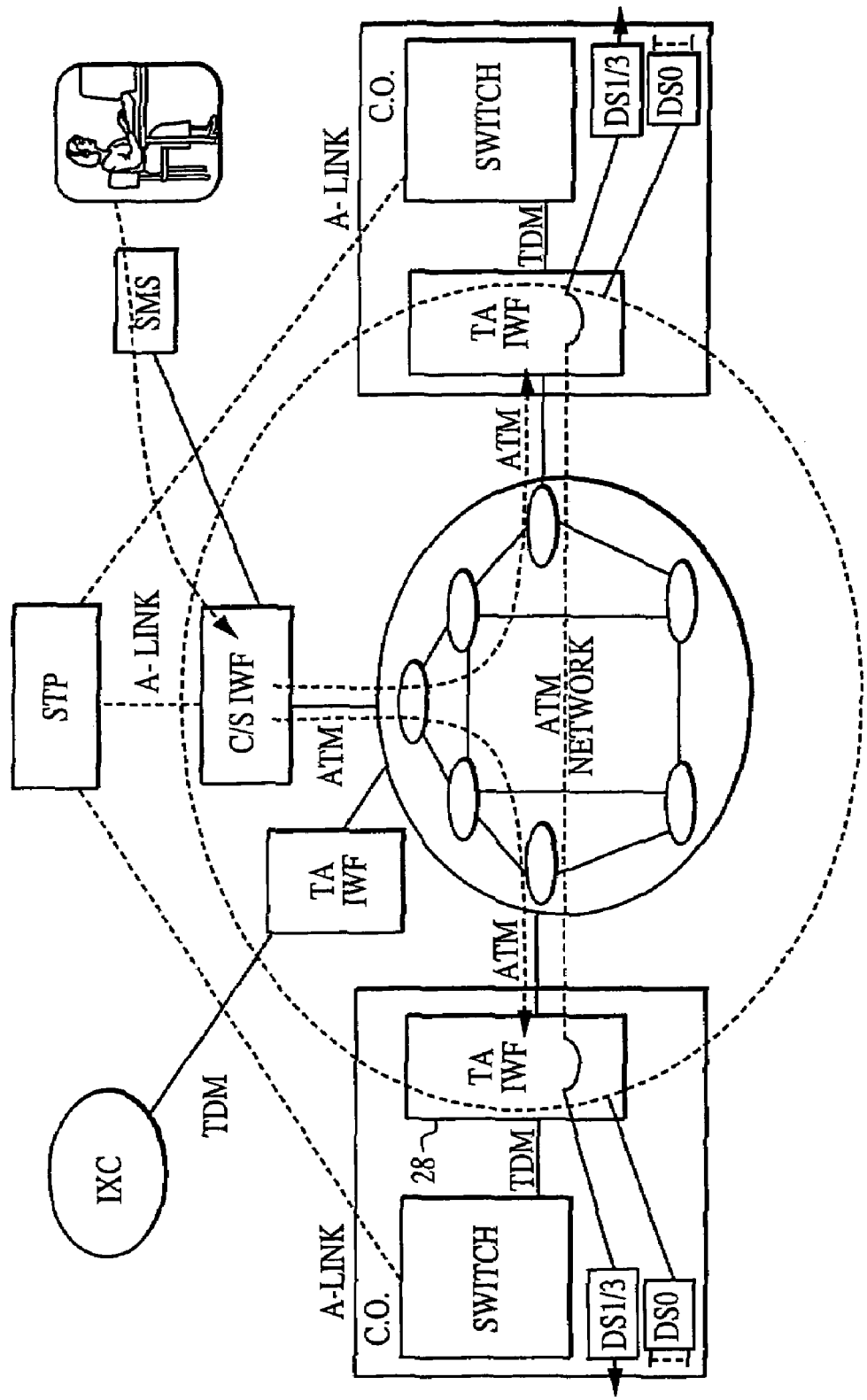
FIG. 9 shows an exemplary architecture of an ATM-based distributed network switching system for private line access, according to an aspect of the present invention.

The private line access interworking function (PLA-IWF) is a unit that is capable of supporting dedicated bandwidth pipes that provide the interface for customer private lines. The lowest data signaling (DS) level supported is DS1 or 1.544 Mbps then progressing to the DS3, STS1, and OC3 rates. This unit also should have ATM SAM capabilities. Although the PLA-IWF could be a separate device, in FIG. 9 the TA-IWF 28 provides the private line functionality. Alternatively, the LA-IWF could provide such functionality.

Unit device and circuit setup is under the control of the LACPS. Circuits are set up across the ADNSS by provisioning done in the SMS and executed by the LACPS. The circuit may be a nailed up ATM SVC that will guarantee the contracted bandwidth to the customer. This contracted bandwidth may be CBR, variable bit rate real time ($VBR_{RT}$), variable bit rate non-real time ($VBR_{NRT}$), ABR, or undefined bit rate (UBR).

According to this embodiment, the SVC is only disconnected by provisioning, allowing the paradigm of a redundant private line. If there is a failure in the ATM network path for this private line, a release will be issued and the originating PLA-IWF will issue another connect message that will re-establish the SVC, thus restoring the failed private line.

The PLA-IWF is under the control of the LACPS. The private line in the ADNSS is similar to the nailed up circuit in the Class 5 switch. It is a provisioned resource end to end. One of the differences is the size of the pipe that is established. In the Class 5 switch a nailed up circuit is DS0 based and uses a fixed TDM resource. In ADNSS this nailed up circuit may be of any bandwidth up to OC3. This bandwidth is provisioned via an SVC from PLA-IWF to PLA-IWF. This allows the single point of provisioning for an ATM based circuit from PLA-IWF to PLA-IWF.

Figure 10:
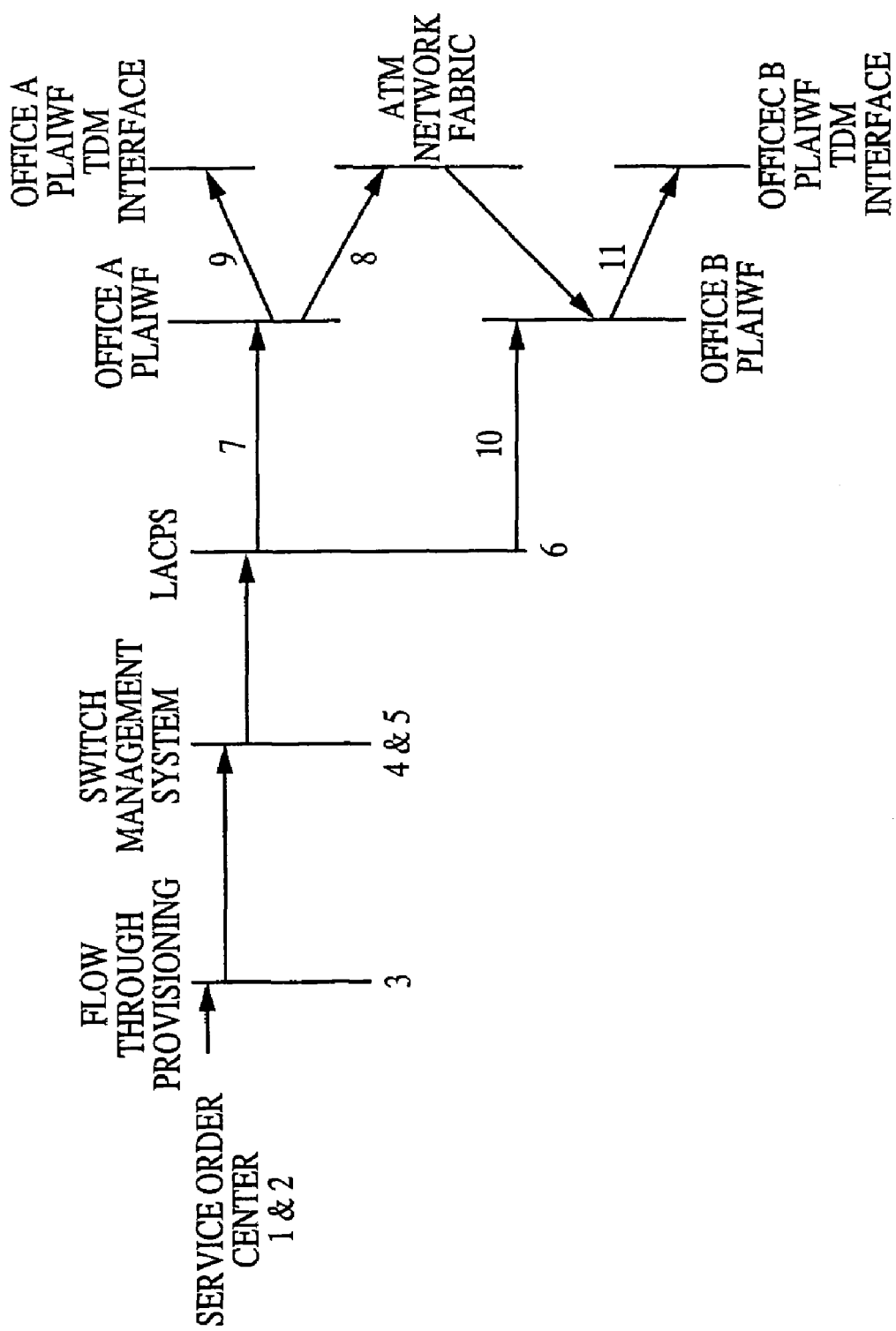
FIG. 10 shows an exemplary private line setup flow, according to an aspect of the present invention.

An ADNSS private line setup flow scenario is now described with reference to FIG. 10. Initially, the service order center takes an order for a 1.544 Mbps circuit across the network from office A to office B. The service order clerk enters the service order into a flow through provisioning system (or optionally directly into the ADNSS) with the proper attributes that define the point to point circuit. As the order flows through the provisioning system, appropriate inventory systems are queried for idle port equipment assignments and then are updated when the ports are incorporated into the service order.

A mechanized service order interface to the SMS allows the flow through provisioning system to assign a nailed up SVC from office A to office B. The assignment is accomplished by associating the office A PLA-IWF port to the office B PLA-IWF port and assigning the bandwidth, 1.544 Mbps, to the port. When the provisioning system is finished with the input of circuit descriptive information into the SMS, it instructs the SMS to execute the order.

The system updates its database and downloads the new provisioning information to the LACPS for action. The LACPS then informs the master office A's PLA-IWF, as defined by the circuit descriptive information, that it needs to set up an SVC. Office A's PLA-IWF or a proxy function formulates a standards based (e.g., UNI 4.0, PNNI 1.0, etc.) protocol message to set up the SVC through the ATM network.

Office A's PLA-IWF sets an internal cross-connect from the TDM port assigned by the service order to the ATM VPI/VCI assigned to the SVC. The LACPS then informs the slave office B's PLA-IWF that a TDM port is assigned by the service order and that this port will be slaved to office A's assigned port. Via standards based protocols (e.g., BICC, etc.) the broadband and narrow band ports are associated. Upon receipt of the setup message from office A's PLA-IWF, office B's PLA-IWF sets the cross-connect between the assigned ATM VPI/VCI and TDM port. At this time the circuit is available for customer equipment attachment.

Upon completion of this attachment and line up tests, the circuit may be placed into service.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For example, because the ADNSS is a plug and play system, it is contemplated that ADNSS will work with Internet Protocol (IP) systems. Furthermore, ADNSS can migrate from ATM cells to a newer high speed backbone, e.g., terabyte switching, as it becomes more widely available.

In accordance with various embodiments of the present invention, some of the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards represents examples of the state of the art. Such standards are periodically superseded by faster or more efficient equivalents having essentially the same functions. Accordingly, replacement standards and protocols having the same functions are and will be considered equivalents to those set forth herein.

What is claimed is:

1. A distributed call control system configured to operate with a signaling transfer point to transfer voice over a packet based network, the system comprising:

a centralized call processor server configured to perform call control functions and to convert common channel signaling received from the signaling transfer point into a plurality of packets, the centralized call processor server sending packetized call processing and control information to at least one access interworking function (A-IWF) device via the packet based network, each A-IWF device being configured to dynamically establish end-to-end connections to another A-IWF device, each A-IWF device accommodating digital subscriber line access, the centralized call processor server comprising a billing server configured to create and collect call detail records, and a feature server configured to perform call control functions, the feature server comprising a tone and announcement server configured to provide network tones and announcements.

2. The system according to claim 1, wherein the common channel signaling comprises signaling system 7 (SS7) signaling.

3. The system according to claim 1, wherein the centralized call processor server communicates with the at least one A-IWF device using session initiation protocol (SIP).

4. The system according to claim 1, in which the feature server further comprises:

a system management server configured to perform operations, administration, maintenance, and provisioning (OAM&P); and a call control server configured to perform call control functions and device control functions for the at least one A-IWF device, the call control server providing services and features supported by a telephone switch.

5. A distributed call processing system for transporting voice over a packet switching network, comprising:

a plurality of access interworking function (A-IWF) devices each operating as a gateway, interfacing data circuit type access into the packet switching network, the packet switching network comprising at least one dynamically established end-to-end connection, at least one of the A-IWF devices directly interfacing with the dynamically established connection to connect with another of the A-IWF devices; and a centralized call processing server configured to perform call control and administration for call processing and control within the packet switching network, the centralized call processing server receiving control signaling from a signaling network, the centralized call processing server comprising a billing server configured to create and to collect call detail records, and a feature server configured to perform call control functions, the feature server comprising a tone and announcement server configured to provide network tones and announcements.

6. The system according to claim 5, wherein the control signaling comprises signaling system 7 (SS7) signaling.

7. The system according to claim 5, in which the centralized call processing server is configured to communicate with the at least one A-IWF device using session initiation protocol (SIP).

8. The system according to claim 5, in which the feature server further comprises:

a system management server configured to perform operations, administration, maintenance, and provisioning (OAM&P); and a call control server configured to perform call control functions and device control functions for the at least one A-IWF device, the call control server providing services and features supported by a telephone switch.

9. The system according to claim 5, in which each A-IWF device further comprises a line access interworking function (LA-IWF) configured to interface with a customer premises device configured to provide digital subscriber line telephony service.

10. The system according to claim 5, wherein when the dynamically established connection fails, the dynamically established connection is released and another connection is dynamically established so that the failed dynamically established connection is restored.

11. A distributed network switching system, comprising: a centralized call processor server configured to perform call control and administration for call processing and control within a packet switching network and configured to receive public switched telephone network (PSTN) signaling, the centralized call processor server communicating with a plurality of access interworking function (A-IWF) devices configured to provide data circuit access into the packet switching network to enable voice transport across the packet switching network, at least one of the A-IWF devices being configured to dynamically establish an end-to-end connection to another A-IWF device, wherein the system provides the functionality of a standard network backbone and allows an access device connected via digital subscriber line to communicate across the packet switching network,
    wherein the centralized call processor server comprises a billing server configured to collect billing information for calls and a feature server configured to perform call control functions, including providing network tones and announcements.

12. The system according to claim 11, wherein the PSTN signaling comprises signaling system 7 (SS7) signaling.

13. The system according to claim 11, wherein the centralized call processor server communicates with the at least one A-IWF device using session initiation protocol (SIP).

14. The system according to claim 11, in which the feature server comprises:
    a system management server configured to perform operations, administration, maintenance, and provisioning (OAM&P); and
    a call control server configured to perform call control and device control for the plurality of A-IWF devices, the call control server providing services and features supported by a telephone switch.

15. The system according to claim 11, in which each A-IWF device further comprises a line access interworking function (LA-I WF) configured to interface with a four wire loop customer premises devices configured to provide a digital subscriber line telephony service.

* * * * *